United States Patent
Khan et al.

(10) Patent No.: US 7,328,806 B2
(45) Date of Patent: Feb. 12, 2008

(54) APPARATUS FOR FROTH CLEANING

(75) Inventors: Latif A. Khan, Champaign, IL (US); John Lytle, Champaign, IL (US); Ken Ho, Carterville, IL (US)

(73) Assignee: University of Illinois, Urbana, IL (US)

( * ) Notice: Subject to any disclaimer, the term of this patent is extended or adjusted under 35 U.S.C. 154(b) by 524 days.

(21) Appl. No.: 10/883,232

(22) Filed: Jul. 1, 2004

(65) Prior Publication Data
US 2004/0256294 A1    Dec. 23, 2004

Related U.S. Application Data

(62) Division of application No. 10/306,131, filed on Nov. 27, 2002, now Pat. No. 6,793,079.

(51) Int. Cl.
*B03D 1/14*    (2006.01)
*B03D 1/16*    (2006.01)

(52) U.S. Cl. ...................... 209/168; 209/169

(58) Field of Classification Search ............... 209/168, 209/169, 170
See application file for complete search history.

(56) References Cited

U.S. PATENT DOCUMENTS 1,952,727 A    3/1934    Ralston (Continued)

FOREIGN PATENT DOCUMENTS

EP    1 099 792 A2    5/2001

(Continued)

OTHER PUBLICATIONS

International Search Report of the European Patent Office in International Application No. PCT/US03/28785 dated Jan. 12, 2004 (5 pages).

*Primary Examiner*—Thomas M. Lithgow
(74) *Attorney, Agent, or Firm*—Marshall, Gerstein & Borun LLP

(57) ABSTRACT

A process of separating a desired constituent from a mixture of particulate matter including the steps of: conditioning a liquid mixture of particulate matter with a frothing agent to create a pulp; aerating the pulp to generate a float fraction of froth supported on the surface of a non-float fraction of pulp; separating a portion of froth from the float fraction; draining the separated froth; washing the separated froth with a liquid to dislodge particles comprising one or more of non-selectively attached, entrained, and entrapped particles; and recovering the washed froth, is disclosed herein. Also disclosed herein are a froth cleaning apparatus and a froth flotation apparatus for separating a desired constituent from a mixture of particulate matter. The froth cleaning apparatus includes a hood including a lower peripheral edge for interface with the top of a froth flotation cell; a discharge orifice disposed in the hood; a froth support in communication with the discharge outlet for receiving and supporting froth; and a wash sprayer disposed downstream of the discharge orifice. The flotation apparatus includes: a wall defining a flotation cell; an aerator for aerating a mixture of particulate matter to produce froth; a feed opening for introducing a mixture of particulate matter and/or froth into the cell; a discharge orifice in a wall of the cell; a froth support in communication with the discharge outlet for receiving and supporting the froth; and a wash sprayer disposed downstream of the discharge orifice.

39 Claims, 13 Drawing Sheets

U.S. PATENT DOCUMENTS

| | | |
|---|---|---|
| 2,182,442 A | 12/1939 | Booth |
| 2,369,401 A | 2/1945 | Morash |
| 2,756,877 A | 7/1956 | Sayers |
| 3,032,199 A | 5/1962 | Sumiya |
| 3,371,779 A | 3/1968 | Hollingsworth et al. |
| 4,668,382 A | 5/1987 | Jameson |
| 4,804,460 A | 2/1989 | Moys et al. |
| 4,851,036 A | 7/1989 | Anthes et al. |
| 4,913,805 A | 4/1990 | Chin |
| 4,938,865 A | 7/1990 | Jameson |
| 4,964,576 A | 10/1990 | Datta |
| 5,039,400 A | 8/1991 | Kallioinen et al. |
| 5,066,389 A | 11/1991 | Zlobin et al. |
| 5,096,572 A | 3/1992 | Hwang |
| 5,116,487 A | 5/1992 | Parekh et al. |
| 5,167,798 A | 12/1992 | Yoon et al. |
| 5,249,688 A | 10/1993 | Hwang |
| 5,611,917 A | 3/1997 | Degner |
| 5,804,061 A * | 9/1998 | Hebert et al. ............... 209/170 |
| 5,965,857 A | 10/1999 | Hughes |
| 5,968,353 A | 10/1999 | Herbert et al. |
| 6,095,336 A | 8/2000 | Redden et al. |
| 6,279,749 B1 | 8/2001 | Gommel et al. |
| 2001/0010294 A1 | 8/2001 | Britz et al. |

FOREIGN PATENT DOCUMENTS

| | | |
|---|---|---|
| WO | WO 93/14876 | 6/1993 |
| WO | 93/20945 | * 10/1993 |

* cited by examiner

APPARATUS FOR FROTH CLEANING

CROSS-REFERENCE TO RELATED APPLICATION

This is a division of U.S. patent application Ser. No. 10/306,131 filed Nov. 27, 2002 (now U.S. Pat. No. 6,793,079).

BACKGROUND OF THE INVENTION

1. Field of the Invention

The invention generally relates to the concentration or beneficiation of minerals and other particulate matter by froth flotation, and more particularly relates to a method and apparatus for concentration or beneficiation of particulate matter separated from undesired waste by means of froth flotation.

2. Brief Description of Related Technology

Commercially valuable substances, such as coal and minerals, are commonly found in nature mixed with relatively large quantities or prohibitive quantities of unwanted substances, As a consequence, it is usually necessary to beneficiate or clean ores to concentrate a desired substance or, put another way, reduce the content of an unwanted substance. Similarly, recycling processes, such as de-inking of paper fibers, involve the separation of a desired substance (paper fibers) from an unwanted substance (ink).

Mixtures of finely-divided product particles and finely-divided waste particles can be separated and concentrates obtained therefrom by froth flotation techniques. Generally, froth flotation involves conditioning a liquid, commonly aqueous, pulp (or slurry) of the mixture of product and waste particles with one or more frothing agents and optional reagents, and aerating the pulp. The conditioned pulp is aerated by introducing into the pulp a plurality of air bubbles which tend to become attached to either the product particles or the waste particles, thereby causing these particles to rise and generate a float fraction of froth on the surface of a non-float fraction of pulp. The difference in density between air bubbles and water provides buoyancy that preferentially lifts hydrophobic solid particles to the surface. In known processes, the float fraction overflows or is skimmed from the flotation apparatus.

Froth flotation is often used to separate solids of similar densities and sizes, which factors prevent other types of separations based on gravity that might otherwise be employed. It is especially useful for particle sizes below about 100 µm (about 150 mesh), which are typically too small for gravity separation using jigging and tabling. The lower-size limit for flotation separation is typically about 35 µm (about 400 mesh). At smaller particle sizes, it becomes difficult to take advantage of surface-property differences to induce selective hydrophobicity. On the other hand, particles greater than about 200 µm (about 65 mesh) tend to be readily sheared from bubble surfaces by collision with other particles or vessel walls.

Today, at least 100 different minerals, including almost all of the world's copper, lead, zinc, nickel, silver, molybdenum, manganese, chromium, cobalt, tungsten, and titanium, are processed using froth flotation. Another major usage of froth flotation is by the coal industry for desulfurization and the recovery of fine coal, once discarded as waste. Since the 1950's, flotation has also been applied in many non-mineral industries including sewage treatment; water purification; paper de-inking; and chemical, plastics, and food processing.

In conventional subaeration cells, the pulp ordinarily is aerated by means of a mechanical impeller-type agitator and aerator which extends down into the body of pulp and which disperses minute bubbles of air throughout the body of pulp by vigorous mechanical agitation of the pulp.

In conventional froth-flotation columns, air for aeration is introduced directly into a relatively quiescent body of pulp by means of an air diffuser or sparger which is immersed in or in direct contact with the pulp, or by introduction of pre-aerated water, e.g. from below a flotation compartment.

Generally, subaeration cells have a relatively higher throughput than froth-flotation columns, but froth-flotation columns can provide better separation between desired and undesired components. As a consequence, when both high throughput and good separation are desired, subaeration cells typically are used in series and froth-flotation columns are used in parallel. In some cases, the flotation operations are conducted in stages wherein the concentrate obtained from the float fraction in one stage can comprise a different substance from the concentrate obtained from the float fraction in another stage.

Typical undesired impurities in coal include pyrite, sulfur, and other ash-forming mineral matter. Pyrite in many U.S. coals occurs in large quantities as fine-grained matter varying in size between 20 microns (µm) and 32 µm. In some coals, such as is available in Illinois, a significant part of the pyrite is less than 20 µm. To make use of these types of coals more fully, a coal cleaning method capable of processing very finely ground coal in which most of the pyrite particles have been liberated must be used. Similarly, reduction in or removal of ash-forming matter can improve marketability and heat content of cleaned coals, because ash is incombustible and has been linked to poor heat exchange and reduced boiler performance.

In addition, because every coal mine and preparation plant produces fines in the course of extracting and processing coal, failure to recover coal from fines increases the proportion of produced coal that is discharged into the environment (e.g., into tailing ponds) which results not only in a loss of potential revenue but also in an environmental impact.

The separation of fine particles by froth flotation techniques presents particular obstacles which are only overcome with great difficulty and cost by known techniques, such as use of multiple machines in series or parallel, and known techniques still have limitations in the degree of separation which can be achieved.

Thus, it is a continuous goal in the industry to have methods and apparatus which improve the separation of desired particulate matter from undesired particle matter.

SUMMARY

One aspect of the disclosure is a method of separating a desired constituent from a mixture of particulate matter, including the steps of aerating a pulp to generate a float fraction of froth supported on the surface of a non-float fraction of pulp, separating a portion of froth from the float fraction, draining the separated froth, washing the separated froth to dislodge one or more undesired constituents, and recovering the washed froth.

Another aspect of the disclosure is an apparatus for separating a desired constituent from a mixture of particulate matter, the apparatus including at least one wall, preferably walls, defining a flotation cell; an aerator for aerating a mixture of particulate matter to produce froth; a feed opening for introducing a mixture of particulate matter and/or froth into the cell; a discharge orifice in a wall of the cell; a froth support in communication with the discharge orifice for receiving froth from the cell and supporting the froth; and a wash sprayer disposed downstream of the discharge orifice. If the apparatus is operated in a semi-batch or continuous mode, then preferably the apparatus will include a liquid drain in a wall of the cell, for example in the lower end of the cell.

Still another aspect of the disclosure is a froth cleaning apparatus for use with a froth flotation cell that causes froth to collect at the top of the cell. The apparatus will generally include all of the elements of the apparatus described above, except that various elements (such as the walls of the cell, the aerator, and other elements found in flotation cells) can be provided with the flotation cell. Thus, one embodiment of such a cleaning apparatus includes a hood including a lower peripheral edge for interface with the top of a froth flotation cell; a discharge orifice disposed in the hood; a froth support in communication with the discharge orifice for receiving pulp and/or froth and supporting the froth; and a wash sprayer disposed downstream of the discharge orifice.

Further aspects and advantages of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to the specific embodiments described herein.

DETAILED DESCRIPTION OF EMBODIMENTS

Figure 1:
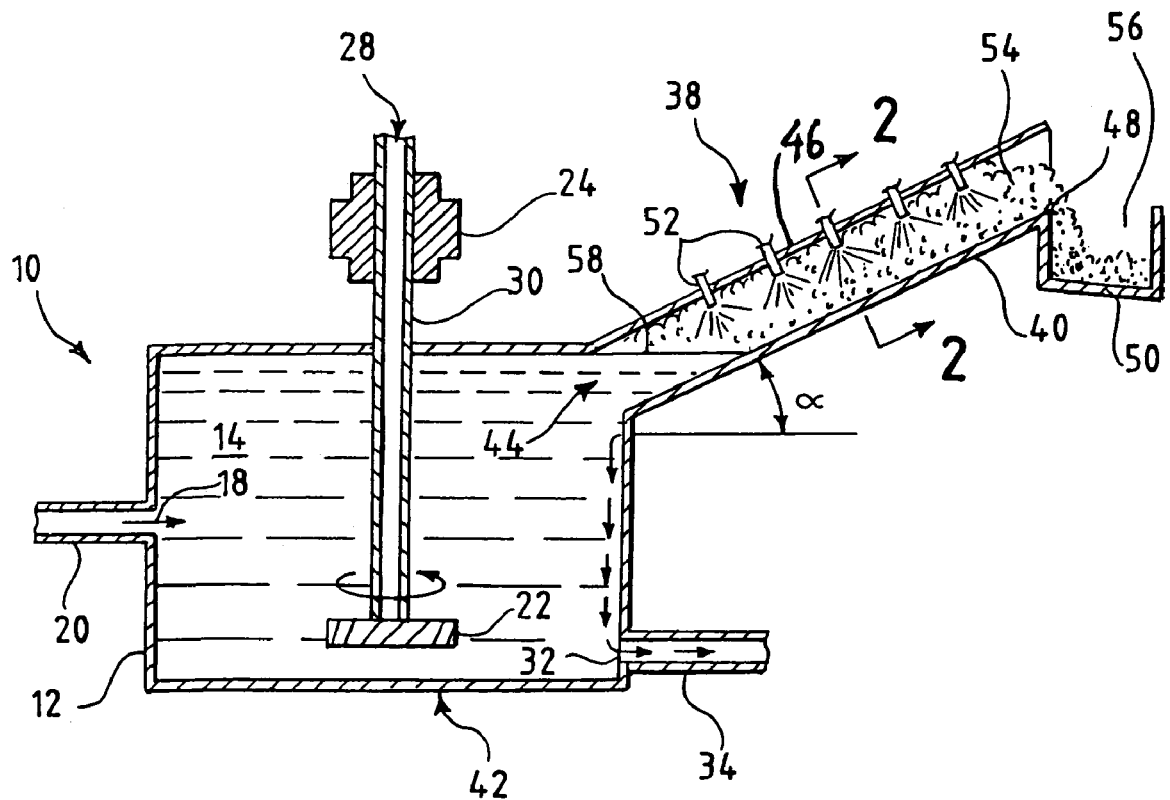
FIG. 1 is a partial cross-sectional view of a froth flotation apparatus according to the disclosure.

The invention generally relates to a method and apparatus for separation and concentration of particulate matter, and is particularly advantageous for beneficiation of coal fines.

One aspect of the disclosure is a method of separating a desired constituent from a mixture of particulate matter, including the steps of aerating a pulp to generate a float fraction of froth supported on the surface of a non-float fraction of pulp, separating a portion of froth from the float fraction, draining the separated froth, washing the separated froth to dislodge undesired constituents, and recovering the washed froth.

The mixture of particulate matter is combined with a liquid and a frothing agent to create a pulp. The frothing agent stabilizes bubbles that are created by the introduction of air into the pulp. For practical reasons, the major liquid component of the pulp typically will be water, though this need not be the case.

The mixture of particulate matter is not limited to any specific type of compounds. Typical applications can include mineral processing and waste processing. Examples include separation of coal from mixtures including gangue materials such as sulfur, pyrite, and other ash-forming materials; separation of cellulosic (e.g., paper) fibers from mixtures with ink; separation of dolomite from phosphate-containing minerals; separation of hematite from quartz; separation of chalcopyrite and/or chalcocite from silicate gangue minerals; separation of zeolite from quartz; separation of quartz from magnesite; separation of calcite from apatite; separation of feldspar from nepheline syenite; and separation of silica-containing minerals from limestone.

The mixture of particulate matter is not limited to any specific particle sizes; however, the method and apparatus disclosed herein offer significant advantages over known methods of processing mixtures with very fine particle sizes, such as less than about 0.65 mm.

A frother (frothing agent) can be added to promote the formation of stable bubbles under aeration. A frother preferably includes both a polar end and a nonpolar end. The type and amount of frothing agent suitable will vary with the mixture of particulate matter and the constituent desired to be separated, similar to known art. Frothers are generally classified by their polar groups, with the most common being hydroxyl, carboxyl, carbonyl, amino, and sulfo groups. Preferably, the frother will contain at least five or six carbon atoms in a straight-chain, nonpolar group for sufficient and stable interaction with the gaseous (e.g., air) phase. For branched-chain hydrocarbons, the number of carbon atoms in the nonpolar group preferably is about 16 or less. For example, methyl isobutyl carbinol (MIBC) is a suitable frothing agent for use with coal. Often, a suitable type and amount of frothing agent cannot be accurately predicted for a particular type of ore, but can quickly be determined by empirical testing. The type of frothing agent is typically a secondary consideration, chosen after a collector (described below), to provide suitable frothing conditions without interfering with a collector or separation system (i.e., combination of a collector and other optional reagents).

Optionally, the pulp can contain one or more reagents selected from collectors, activators, depressants, dispersants, and other modifiers (e.g., pH modifiers). Collectors are used to invoke selective hydrophobicity, and are typically heteropolar organic substances. The nonpolar end is almost always a long-chain or cyclic hydrocarbon group that is hydrophobic. Preferably, a suitable collector will selectively induce hydrophobicity on the desired material to be recovered while retaining hydrophilicity of the nondesirable material. Both anionic and cationic collectors can be used. Examples of anionic collectors include sodium oleate, xanithates, dithiophosphates, alkyl sulfuric salts. The most common cationic collectors include amine groups, such as aniline and pyridine, and are optionally used with an acid to induce solubility. Because of the inherent heteropolarity of collectors, a collector can also serve as a frother in some systems (e.g., sodium oleate and sulfosoliophil fatty acids).

The natural hydrophobicity of coal (especially freshly ground coal) is an asset which minimizes the use of collectors. However, on extended storage, or if the coal or coal seam has been in contact with air for a few years (even days, in some circumstances), the coal can tend to lose much of its hydrophobicity, and is often then referred to as "weathered coal." The addition of a collector, such as hydrocarbon oils (e.g., kerosene or fuel oil), can make coal more floatable. Typically-used alcohols include MIBC, and amyl, hexyl, heptyl and octyl alcohols. Typical amounts of oils and alcohols per 1 ton of coal are about 50 gr/ton to about 250 gr/ton and about 250 gr/ton to about 1000 gr/ton, respectively.

Activators can be added to chemically "resurface" the solid to increase interaction with collectors that are otherwise ineffective alone. Depressants form a polar chemical envelope around a solid particle that enhances hydrophilicity or selectively prevents interaction with collectors that might induce unwanted hydrophobicity. Dispersants act to break agglomerated particles apart so that single particles interact with the collector and air bubbles. A pH modifier (e.g., an alkaline modifier such as caustic soda, lime, and soda ash; and an acidic regulator such as hydrochloric and sulfuric acids) can be used, because the hydrophobicity of systems is often optimal within a particular pH range, and some frothers require a certain pH range to form stable bubbles. A pH modifier can, in some cases, also serve as one or more of a dispersant, a depressant, and an activator.

The pulp is aerated to generate a float fraction of froth supported on the surface of a non-float fraction of pulp. The float fraction includes a plurality of bubbles, at least a portion of which are selectively attached to a desired constituent of the pulp. Aeration can be achieved by various techniques, including a sparger, impeller, agitator, and the like, disposed within the pulp. As used herein, the term "aerate" and forms thereof are defined to relate to not only air but also any other gaseous substance. For example, nitrogen bubbles have been used to effect the separation of copper sulfide minerals from molybdenum sulfide minerals. In a preferred embodiment, aeration is achieved via the introduction of air through the shaft of an agitator, and exits into the pulp at the bottom of the agitator (i.e., subaeration). In another embodiment, aeration can be achieved via an aerator that includes an injector jet disposed in a conduit and a source of air in communication with the conduit, such as disclosed in U.S. Pat. No. 4,938,865 (Jul. 3, 1990), the disclosure of which is incorporated herein by reference. By use of such an aerator, air can be entrained into liquid pulp, for example to create a downward-moving foam bed in a column that enters from the lower part of the column into a vessel, in which the froth separates from liquid, forming a liquid(pulp)/froth interface.

By use of a method and apparatus according to the disclosure, the amount of air required by the system is surprisingly substantially reduced compared to known methods. For example, a 100 ft$^3$ (about 2.8 m$^3$) subaeration cell with an open top would typically require about 300 ft$^3$/min (about 8.5 m$^3$/min) of air supply (e.g., from a blower), whereas a similarly-sized cell according to the disclosure herein that includes a closed top would require only about 15 ft$^3$/min (about 0.4 m$^3$/min) of air supply.

The location (typically, the level within a vessel) of the liquid/froth interface is a variable that can be adjusted by the operator of a flotation cell. In a preferred method according to the disclosure wherein very fine froth is produced, the liquid/froth interface is formed near the nominal "top" of the primary enclosure of the vessel, more preferably at or above the top. Thus, in one embodiment, the liquid/froth interface is formed at a position slightly above the top of the primary enclosure of the vessel, such that the area of mixing within the apparatus is further separated, preferably isolated, from the area of particle separation. Very fine froth can be produced by various methods, such as by using a high concentration of flotation reagent, or by using an emulsified flotation reagent, such as EKOFOL 440 kch reagent available from EKOF Flotation GmbH of Bochum, Germany. This aspect of the preferred methods is described below in connection with embodiments of the apparatus disclosed herein.

A portion of the froth is substantially separated from the float fraction of froth. Thus, in one embodiment of the method, froth rising from the liquid/froth interface continuously pushes already-formed froth (in layers above) up the slope of an upwardly-inclined surface of a froth washer, such that the already-formed froth is then supported, at least in part, by the upwardly-inclined surface of the froth washer. The product-laden bubbles escape from the surface of the slurry and move up the surface of the support. Without such a separation, the already-formed froth would continue to rise, and as more froth is generated below the weight above would tend to reach a critical value and destabilize a portion of the froth layer. In another embodiment, froth from the float fraction can be separated in other ways, including mechanical methods, such as by pickup and conveyance along a moving belt disposed, for example, at, adjacent to, or above the liquid/froth interface. As another example, froth can be separated via other pressure differentials (e.g., discharge by force from produced froth, pneumatic conveyance such as from higher air pressure in the cell, suction, and the like). Other ways of achieving separation will be apparent to those of skill in the art in view of the disclosure, and the disclosure is not meant to be limiting.

Furthermore, separation can facilitate improved washing of the froth. In known processes wherein froth supported on a layer of pulp is washed, the non-selectively attached particles travel downwardly (i.e., in the direction of gravity) through layers of froth below, increasing the probability that the particles washed from the top layer will attach to any one of the layers of bubbles below. While in theory the flow of froth in such processes over a simple weir according to the prior art will naturally tend to include froth from the top layers of the float fraction, this is not always the case, and froth containing reattached particles also overflows the weir. In addition, even particles that are not attached to froth tend to be carried over the weir with overflowing froth. In contrast, by practice of a method described herein wherein a portion of froth from the float fraction is separated, the opportunities for washed particles to reattach to discharged froth are very much reduced, and the yield of desired constituents of the pulp is surprisingly increased.

Moreover, separation of the froth from the float fraction, can optionally allow for drainage of the froth at various phases of the process. As the froth is drained of liquid, nonselectively-attached particles and particles that might otherwise be carried over into the product are removed (e.g., entrapped and entrained particles). Trhus, for example, as a portion of froth is pushed into and up the froth washing chute described below, the froth is substantially drained of pulp liquid and particles (e.g., nonselectively-attached particles) beginning at the time of separation by such liquid running down the surface of the upwardly-inclined froth support (under the froth) and back into the cell. Thus, a froth drainer can include an upwardly-inclined froth support, a froth support including a perforated region for more efficient separation of wash liquid (e.g., porous or containing other holes, such as a screen), an entirely perforated support, and the like.

Preferably, the froth is at least partially drained before washing, preferably substantially drained. In addition, if the froth is subsequently washed in such an apparatus, then the froth preferably will be drained of wash water and particles both during and subsequent to washing.

A method of separating or concentrating a desired constituent from a mixture of particles as described herein includes a step of washing separated froth with a liquid to dislodge undesired particles from the froth. The undesired particles typically will include non-selectively attached, entrained, and entrapped particles, and mixtures thereof. The wash liquid preferably includes as a major component a liquid that is also used in the pulp, for convenience and compatibility. Thus, when the pulp includes water, then preferably the wash liquid is water. The wash liquid can also include one or more additional agents, such as a frother, collector, activator, depressant, dispersant, or other modifier. Preferably, the washing step includes more than one washing operation, and more preferably includes a plurality of washing operations in series, such that each portion of separated froth is washed more than once.

The better the separation of the wash liquid from the separated froth, the lower is the risk that dislodged particles in the wash liquid will reattach to bubbles in the separated froth as the wash liquid is drained from the froth. Thus, the wash liquid that includes dislodged particles preferably is substantially separated from contact with the separated froth, and more preferably is also separated from the washed froth. This can be achieved for example, via an apparatus described below wherein the separated froth travels up an upwardly-inclined surface, such that the wash water flows down the upwardly-inclined surface and has the opportunity to contact only the lowermost layer of bubbles in the separated froth. Preferably, such an upwardly-inclined support can be provided with a nonplanar (e.g., toothed or crenate, crenellated, corrugated, and the like) surface profile, such that the wash liquid collects and travels at the lower extremities of the profile, further separating the froth from the wash liquid. Other ways of achieving such separation will be apparent to those of skill in the art in view of the disclosure, and the disclosure is not meant to be limiting.

As described above, the depth of a layer of froth can affect the stability of the bubbles at the bottom of the froth, and can also affect the effectiveness of washing the froth. For example, the deeper a mass of froth (more layers), the more likely it is that nonselectively-attached particles washed from a top layer will reattach or become entrapped in a lower layer of froth. On the other hand, as the depth of froth decreases, the throughput of the process tends to decrease. In addition, the ability to reject fine contaminant particles appears to decrease with increasing depth, especially for fine particles such as clay and pyrite that have relatively slow settling velocities. Thus, the depth of the separated froth preferably is controlled to achieve a desired balance between factors including those described above. The depth of froth can be controlled, for example, by controlling (e.g., fixed or variable) the height of an opening through which froth is discharged from a flotation chamber or, in addition, by forcing froth through a conduit having a controlled (fixed or variable) height. In previously-known froth flotation apparatus, the froth depth must be of sufficient height to permit froth to flow over a weir without significant carryover of pulp. In contrast, in a method and apparatus as disclosed herein, the froth depth can be relatively smaller, because a portion of the float fraction is separated from the pulp and can be washed and drained while separated. Accordingly, provision of a froth support allows the effective height of a froth column to be increased without affecting the stability of the lower layers of the froth, because much of the mass of the froth is supported by the froth support rather than the underlying bubbles.

The washed froth can be recovered by collecting the froth in a launder as it is discharged at the outlet of a froth washing apparatus or via flow over a weir, with or without mechanical skimming, for example.

The hydrophilic particles remain in the pulp solution, which is eventually decanted off as waste (e.g., a tailing stream), in either a batch, semi-batch, or, preferably, a continuous process. Typically the concentrated stream contains at least one desired, or more valuable, component and the tailing stream contains one or more less valuable components (e.g., gangue). In some applications, however, the more valuable component will be in the tailing stream and a less valuable component will be desired to be removed in the concentrated stream from the froth.

Another aspect of the disclosure is an apparatus for separating a desired constituent from a mixture of particulate matter, the apparatus including at least one wall (e.g., a sphere), preferably walls, defining a flotation cell (e.g., a cylindrical vessel); an aerator for aerating a mixture of particulate matter to produce froth; a feed opening for introducing a mixture of particulate matter and/or froth into the cell; a discharge orifice in a wall of the cell; a froth support in communication with the discharge orifice for receiving froth from the cell and supporting the froth; and one or more wash sprayers disposed downstream of the discharge orifice. If the apparatus is operated in a semi-batch or continuous mode, then preferably the apparatus will include a liquid drain in a wall of the cell, for example in the lower end of the cell. At least a portion, preferably the majority, of the froth support is disposed at or above the top of the flotation cell. In operation, at least a portion, preferably the majority, of the froth support is disposed at or above the froth/liquid interface.

Still another aspect of the disclosure is a froth cleaning apparatus for use with a froth flotation cell that causes froth to collect and/or be confined at the top of the cell. The apparatus will generally include all of the elements and aspects of the apparatus described above, except that various elements (such as the walls of the cell, the aerator, and other elements found in known flotation cells) can be provided with the flotation cell. Thus, one embodiment of such a cleaning apparatus includes a hood including a lower peripheral edge for interface with the top of a froth flotation cell; a discharge orifice disposed in the hood; a froth support in communication with the discharge orifice for receiving froth (and, optionally, pulp) and supporting the froth; and one or more wash sprayers disposed downstream of the discharge orifice.

Either of the above-described apparatus will preferably include one or more features selected from agitators, froth depth controllers, froth motivators (mechanical or otherwise), mesh screens, and perforated plates (for example, disposed in the path of travel of at least a portion of the generated froth).

In a froth flotation apparatus according to the disclosure, the wall or walls defining the flotation cell preferably will define a substantially cylindrical vessel (column) that, in contrast to known flotation cells, is at least substantially closed at the top. The cylinder can have a circular, elliptical, square, rectangular, or any other shape of cross section. The length (height) of the column will typically be greater than the width.

The aerator serves to introduce a gas into a mixture of particulate matter to produce bubbles. The aerator can be selected, for example, from a diffuser, sparger, agitator, and impeller disposed in or in direct contact with the pulp. In a preferred embodiment, aeration is achieved via the introduction of air through the shaft of an agitator, and exits into the pulp at the bottom of the agitator (e.g., a subaeration cell). The aerator can also be located outside a body of pulp, for example a diffuser or sparger that introduces pre-aerated liquid (e.g., water) from outside the flotation compartment. In another embodiment, the aerator located outside a body of pulp can include an injector jet disposed in a conduit and a source of air in communication with the conduit, such as disclosed in U.S. Pat. No. 4,938,865, described above.

A froth flotation apparatus includes a discharge orifice in a wall of the cell. Similarly, a froth cleaning apparatus includes a discharge orifice disposed in the hood. The orifice provides a path for froth and/or pulp to exit the cell. When the top of the orifice extends above the froth support to form a passage of controlled height (e.g., to form a flap or hood and the like over a froth support (e.g., a discontinuous cross-sectional perimeter) or to form a conduit, channel, chute, or pipe, and the like (e.g., a continuous cross-sectional perimeter ) with a froth support), it can also serve as a froth depth controller, for example if froth is generated within the cell and exits through the orifice at an angle (i.e., not vertically).

In either the froth flotation apparatus or the froth cleaning apparatus, a froth support is in communication with the discharge orifice for receiving and supporting froth. The froth support can take any form suitable for conveying and, preferably, draining froth of the desired depth. The froth support can be a single member or an apparatus including a plurality of individual members. Suitable examples include a closed cylindrical conduit and a closed conduit having a rectangular cross-section (e.g., a chute). Preferably, the froth support includes a bottom interior surface (e.g., a major surface supporting the froth) that has an average width greater than the average height of the support. Thus, the width of the conduit will be greater than the height of the conduit, for example.

At least a portion, preferably the majority, of the froth support is disposed at or above the top of the flotation cell. In operation, at least a portion, preferably the majority, of the froth support is disposed at or above the froth/liquid interface. Accordingly, such embodiments will facilitate drainage of the froth, as opposed to froth simply flowing over a weir as in the prior art.

In one embodiment, the froth support includes a froth support surface that has a non-planar profile. As described above, such a feature can serve to promote drainage and separation of froth from drained pulp and/or wash water. Examples include crenate, crenellated, and corrugated profiles. The profile can also be substantially smooth and concave (to direct drained liquid to the center) or convex (to direct drained liquid to the edges).

In another embodiment, the froth support includes a froth support surface that is perforated (e.g., a perforated or porous plate or a screen) to promote drainage of froth and removal of liquid while still supporting the froth, or at least a majority of the bubbles of the froth. Such a perforated froth support can include a channel, conduit, or the like for collecting drained liquid for return to the flotation cell or recycle. For example, the collected drained liquid can be recycled to make up additional pulp, or can be filtered to provide a recycle wash water stream. Alternatively, the collected drained liquid can be discharged from the process.

When the froth support has a continuous cross-sectional perimeter (e.g., to form a substantially closed channel, chute, conduit, or the like), such that gas (e.g., air) introduced into the cell acts as a driving force, especially when it is the sole driving force, for froth to move through the support then preferably the support includes a vent for release of air. The vent preferably is located at the top of the support. The distance of the vent from the discharge opening of the cell, and the size of the vent, will tend to affect pulp and froth flow dynamics. For example, for a pulp in which a relatively high frequency of collision between bubbles and pulp particles is desired, then a high flow rate of air will be desired in the cell, and a relatively large vent and/or a vent located closer to the main body of the cell will be preferred. For an application wherein a relatively long froth support is desired to facilitate cleaning of the froth, then a vent, when used, will preferably be located relatively far from the discharge from the cell, such that the froth has sufficient motivation force behind it to propel it through the support. Accordingly, in a preferred embodiment, one or more of the vent size and the vent location is adjustable. The vent may be a simple hole or can advantageously include a conduit (e.g., a stack or chimney) to prevent substantial loss of froth through the vent. Such a stack can include a damper to permit control over the volume of gas flow.

When the froth support includes a conduit, the conduit can include one or more features to control the depth of froth. For example, the conduit can have a tapered cross section, wherein the end of the conduit in proximity to the first discharge outlet in the wall of the flotation cell or in the hood can have a relatively larger cross-section than the opposite end of the conduit. Such a feature can serve to increase the depth of the froth in the case where a portion of the bubbles in the froth are destabilized during washing. A tapered conduit can alternatively have the reverse configuration, wherein the end of the conduit in proximity to the first discharge outlet in the wall of the flotation cell or in the hood has a relatively smaller cross-section than the opposite end of the conduit. In such an embodiment, the depth of froth will decrease as the froth progresses through the conduit, such that the froth depth is at a minimum during its final washing, whereby the opportunity for reattachment or entrapment of dislodged particles is minimized and thereby a concentrate of high purity is obtained.

The froth support can also include one or more movable parts to control the depth of froth. For example, in an embodiment described below, an upper panel of a froth chute can be selectively positioned relative to the lower panel of the froth chute, to provide a variable height in the chute. Similarly, the bottom panel of such a chute can also be adapted for variability.

The froth support preferably is disposed at an upwardly-inclined angle, such that froth is conveyed up the support. For example, if the flotation cell includes a base having a major plane, the froth support preferably is disposed at an upwardly-inclined angle with respect to the major plane of the base. As for the froth cleaner apparatus adapted for use with a flotation cell, when the lower peripheral edge of the hood substantially lies in a plane, the froth support can be disposed at an upwardly-inclined angle with respect to that plane. Put another way, the froth support preferably is disposed at an angle greater than 90 degrees with respect to the gravity vector when the apparatus is in operation. In similar fashion, when either of the apparatus is in operation, the froth support preferably is disposed at an upwardly-inclined angle with respect to the liquid/froth interface. For example, when concentrating coal fines in an apparatus wherein the froth height is controlled to about 1 inch (about 2.54 cm), then preferably the support angle is about 25 degrees, e.g. 22.5 degrees.

As the froth height is increased, then the angle preferably is also increased. As a result of inclination, the distance that the froth must traverse before being removed from the apparatus is generally greater for a given total froth depth than for a traditional vertical column of froth of the same depth, but the static pressure on the lower layers of the froth is less than a vertical column of froth of the same height. When operating conditions in the cell present the possibility that too much contaminant material will be carried over with the concentrate, a higher angle of inclination can be used. This could be the case, for example, when using a more coarse material and/or when the slurry level is raised and the column of froth within the cell (as opposed to the cleaner section) is kept to a minimum. Under some conditions, the slurry level can actually rise into the lower part of the upwardly-inclined froth cleaner with the froth bearing the product particles emerging from the slurry within the froth cleaning device. Stable froth conditions in the cell may also allow the operator to lower the slurry level, maintain a thicker froth column in the cell, and lower the angle of upward inclination of the washer. Adjustment of the angle of upward inclination of the washer gives the operator another option to control the performance of the cell for given feed materials, rates of throughput, and other variables.

One class of froth support embodiments designed to cope with potential intermittent surges of pulp and concomitant or resulting changes in the position or level of the liquid froth interface includes a non-linear pathway for fluid travel. Thus, for example, when a flotation cell includes a base having a major plane, then the froth support includes first and second sections disposed at upwardly-inclined angles (same or different) with respect to the major plane of the base and the first and second sections are disposed in opposing directions with respect to a plane perpendicular to the major plane of the base. As for the froth cleaner apparatus adapted for use with a flotation cell, when the lower peripheral edge of the hood substantially lies in a plane, the froth support includes first and second sections disposed at upwardly-inclined angles (same or different) with respect to the lower peripheral edge and the first and second sections are disposed in opposing directions with respect to a plane perpendicular to the lower peripheral edge.

Preferably, the support has a convoluted path for fluid travel (e.g., tortuous, serpentine, winding, or boustrophedonic). If the pulp level intermittently rises (e.g., in surging fashion), then one or more deviations in fluid path flow can aid in preventing the surging pulp from contaminating cleaned froth, for example by spilling over a weir into a launder. Such a support preferably includes one or more openings and/or vents for discharge of air. A support having a convoluted path for fluid travel thus can provide a path for easy escape of excess air or gas introduced into a flotation cell without causing excessive spillage from froth from the washer before it can be adequately cleaned.

In an alternative arrangement, the support can be constructed in such a way that its overall length may be increased or reduced (e.g., via a telescopic mechanism) in which one part of the support slides inside another, or by the addition or subtraction of segments of support (e.g., with the same cross-sectional area at segment interfaces), and of a convenient incremental length.

In either the froth flotation apparatus or the froth cleaning apparatus, one or more wash sprayers (e.g., nozzles) are disposed downstream of the discharge orifice. A wash sprayer can be disposed above the surface of the froth support adapted to support froth, preferably in the upper wall and/or side walls of a froth chute. The wash sprayer serves to dispense wash liquid onto and/or into the froth as it is conveyed along the froth support, for example in a cone or plane configuration. Preferably, the wash sprayer will provide a screen of wash liquid through which the froth passes. Thus, preferably, a sprayer is disposed tangential to the flow of froth, and above the froth support. When more than one wash sprayer is used, preferably the sprayers are disposed in series, such that each portion of froth is washed more than once. When each sprayer does not provide wash liquid to the entire height and/or width of froth, the wash sprayers can be disposed in rows or in staggered relationship such that the entire height and/or width of froth undergoes at least one application of wash liquid. In an embodiment such as that described in the Examples below, the turbulence of wash spraying can be increased to a point that would destroy the froth in a typical vertical flotation column; however, due to the very wet and flowing conditions present in the cleaner section, the froth simply becomes more fluid and clean.

The froth support preferably includes a weir over which the washed froth can flow into a launder for recovery.

Either the froth flotation apparatus or the froth cleaning apparatus can also include one or more screens (e.g., a mesh screen) or perforated plates through which a portion of generated froth can travel. For example, the apparatus can include a screen disposed in the path of travel of separated froth in proximity to and/or downstream of the discharge orifice. A screen can serve to separate bubbles to facilitate release of undesired particles entrapped between bubbles, and can help to deter the flow of liquid pulp (e.g., surging pulp), for example to prevent liquid pulp from flowing out through the froth washing device and contaminating washed product. In one embodiment, the froth support includes two plastic plates perforated with 0.25-inch (6.4 mm) diameter holes, the plates disposed a short distance (e.g., about an inch) apart. The holes in the plates had offset centers, which forced the froth through a tortuous path while partially blocking surging pulp from traveling high up into the washing section of the support.

Either of the apparatus can also include one or more froth motivators, including a mechanical froth motivator such as those described below in connection with the figures, to assist in conveyance of froth downstream of the discharge orifice.

A froth flotation apparatus equipped with a froth cleaning system as disclosed herein can be used alone and can also be used in series, for example whereby the cleaned product and/or the tail stream can be fed to a subsequent flotation apparatus.

Specific embodiments are described below in connection with the figures.

FIG. 1 depicts a froth flotation apparatus that includes a wall 12 defining a flotation cell 10 containing a pulp 14 that enters through a feed opening 18 via a feed conduit 20. An agitator 22 driven by a motor 24 is disposed within the interior of the flotation cell 10. Air 28 is fed through the shaft 30 of the agitator 22 for release into the pulp 14 at the bottom of the agitator 22 to achieve subaeration. Pulp containing a relatively higher concentration of undesired particles is discharged from the cell through orifice 32 and conduit 34 at the bottom of the cell 10.

The apparatus also includes a froth cleaner section 38 including a froth support 40 disposed at an angle α with respect to the major plane of the base 42 of the flotation cell 10. Pulp and/or froth enters the cleaner section 38 via orifice 44. The support 40 is in the form of a rectangular chute, with an overflow weir 48 leading to launder 50. Wash sprayers 52 are disposed in a top panel 46 of the chute in series to spray wash liquid on froth 54. Air 28 introduced through the agitator 22 exits through opening 56. The apparatus in FIG. 1 is shown in a manner of operation wherein the liquid/froth interface 58 is at the top of the cell 10 and, thus, within the cleaner section 38. Operation in this manner is preferred to achieve high throughput and vigorous agitation in the interior of the cell 10.

Figure 2:
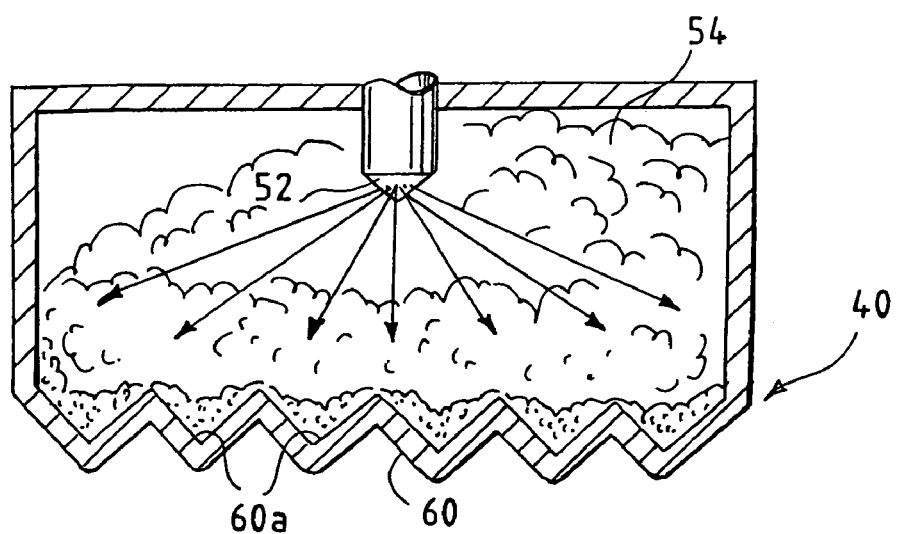
FIG. 2 is a partial cross-sectional view of the froth cleaning section of the apparatus of FIG. 1.

FIG. 2 is a cross-sectional view of the froth cleaning section 38 at the location indicated on FIG. 1, wherein like reference numbers indicate like elements. FIG. 2 shows a sprayer 52 disposed above a crenate (toothed) bottom panel 60 of the froth support 40. In this embodiment, wash liquid will preferentially flow in areas 60a of the froth support, whereas the froth will tend to be supported above.

Another advantage of this embodiment is that it includes no more moving parts than a traditional flotation column which washes the froth at the top of the column and, particularly with respect to a subaeration cell, no additional moving parts in direct contact with the pulp, which can be rather dense (e.g., up to 60% or more solids) and abrasive. As a consequence, operating costs, and in particular the cost of maintenance and repairs, are no greater than for a flotation column or subaeration cell without a froth cleaning device disclosed herein, whereas better separation is obtained.

Figure 3:
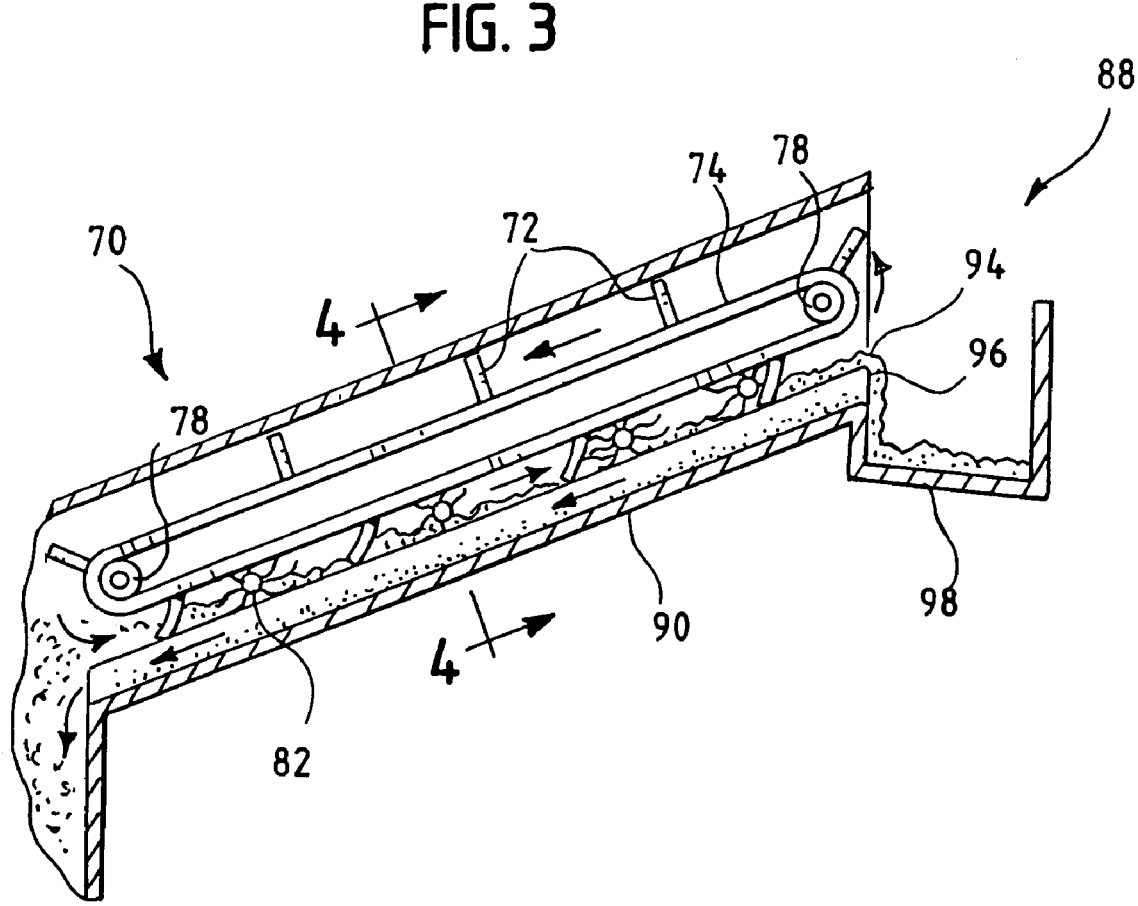
FIGS. 3 and 4 show partial cross-sectional views of a froth cleaning section of an apparatus according to the disclosure.
Figure 4:
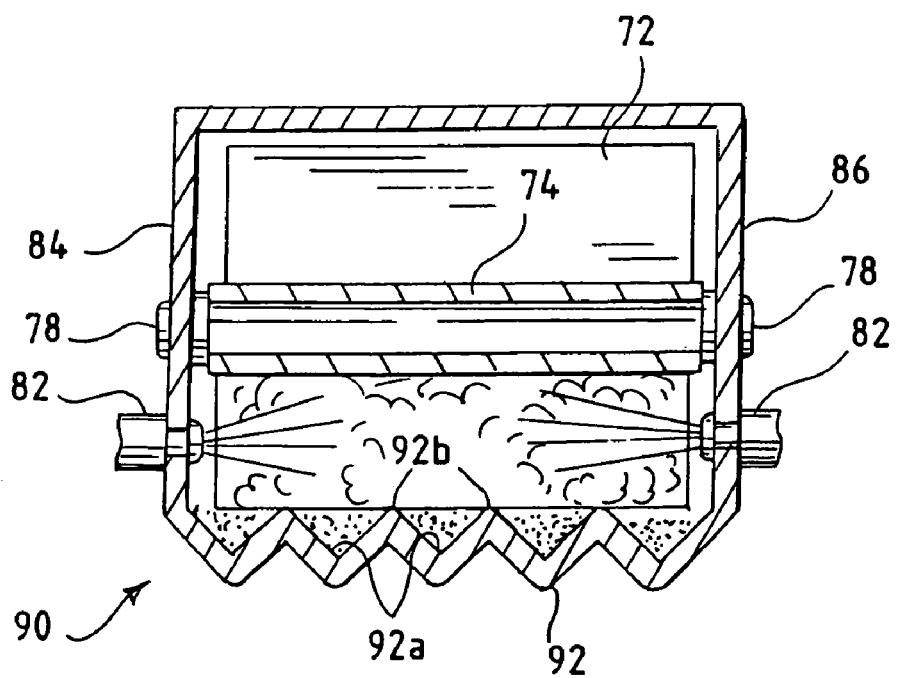

FIGS. 3 and 4 show a partial view and a cross-sectional view, respectively, of a froth cleaning section 70 of a froth flotation apparatus according to the disclosure. This apparatus includes a plurality of mechanical froth motivators in the form of froth pushers 72 attached to a belt 74 supported by spindles 78, one or more of which are driven to rotate the belt. As a consequence of including froth motivators, this apparatus can be disposed at a lower upwardly-inclined angle. In the apparatus shown, wash sprayers 82 are disposed in side walls 84 and 86 (FIG. 4) of the froth support 90. The froth support 90 is shown with a crenate bottom panel 92, and the pushers 72 are disposed such that an edge of each pusher 72 comes in proximity to or in contact with the panel 92 at upper zones 92b to move the majority of froth 94 through the channel formed by the belt 74 and the support 90 in the lower region of the support 90. As in the embodiment shown in FIG. 3, wash liquid will preferentially flow in areas 92a of the froth support. The support 90 includes an air exit opening 88 and an overflow weir 96 leading to launder 98. The embodiment as shown includes a top panel 76, though this need not be the case as long as froth is prevented from escaping the apparatus via other means, such as by provision of a sealing flap (not shown) which can be disposed at region 80, for example, to interface with the belt 74 but still allow passage of the motivators 72.

Figure 5:
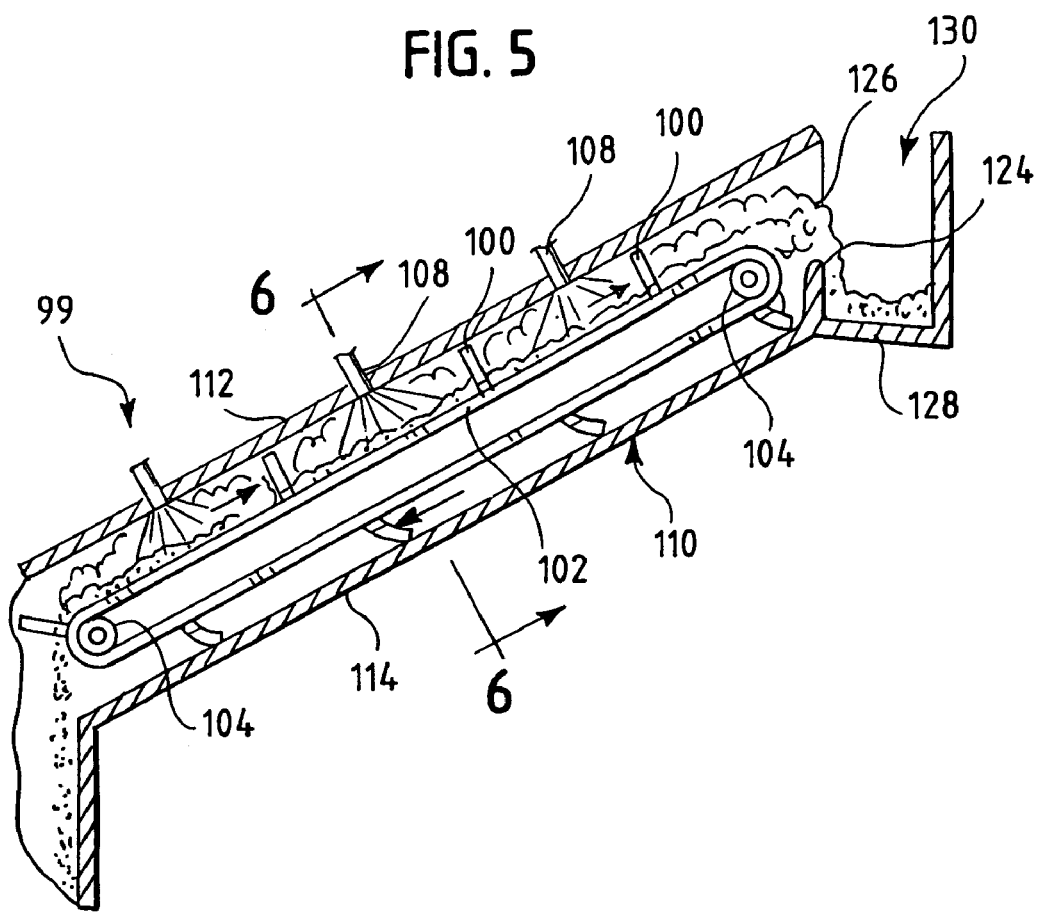
FIGS. 5 and 6 show partial cross-sectional views of a variation of a froth cleaning section of an apparatus according to the disclosure.
Figure 6:
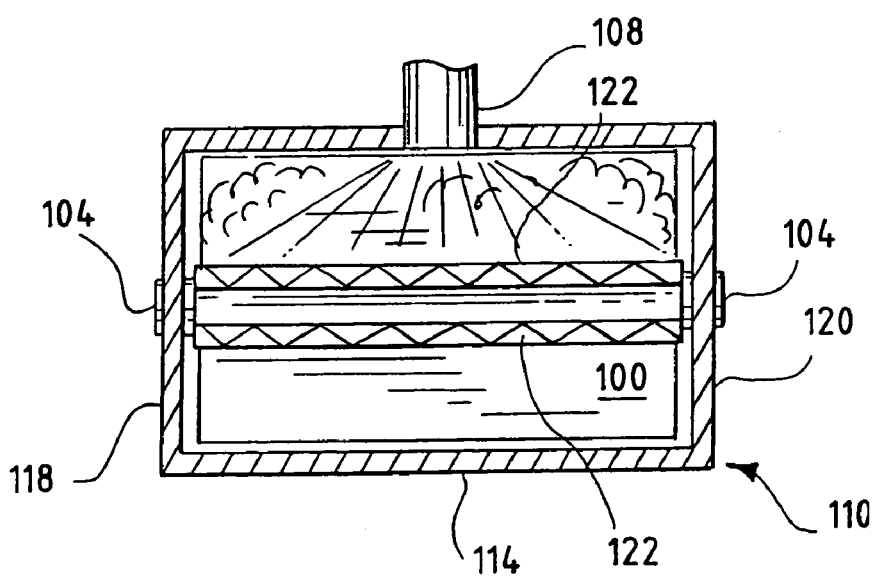

FIGS. 5 and 6 show another variation of an apparatus including a froth cleaning section 99, FIG. 5 being a partial view and FIG. 6 being a corresponding cross-sectional view. This apparatus also includes a plurality of mechanical froth motivators in the form of froth pushers 100 mounted on a belt 102 on spindles 104 and including a series of wash sprayers 108. In this embodiment, the belt 102 and pushers 100 move in the clockwise direction, as shown, such that the froth is moved through the channel formed by the belt 102 and the support 110 in the upper region of the support 110, and the sprayers 108 are disposed in a top 112 of the support 110 to wash the froth that passes by.

The pushers 100 in this embodiment preferably intersect with the support 110 at the bottom panel 114 in a substantially sealing fashion, such that only insubstantial amounts of pulp and/or froth are allowed to enter the bottom channel formed by the belt 102, the bottom wall 114, and sidewalls 118 and 120 of the support 110 in a direction counter to the belt movement. For example, pushers 100 can be constructed of a flexible material and in a length slightly greater than the bottom channel, such that the pushers 100 bend when traveling through the bottom channel. In the embodiment shown, the belt 102 is shown in FIG. 4 to have grooves 122 (shown with a triangular cross-section) through which wash water can flow back into a flotation cell (not shown). The weir 124 in such an embodiment is positioned in such a manner that at least a majority of the washed froth 126 flows into the launder 128 and air exits through opening 130.

Figure 7:
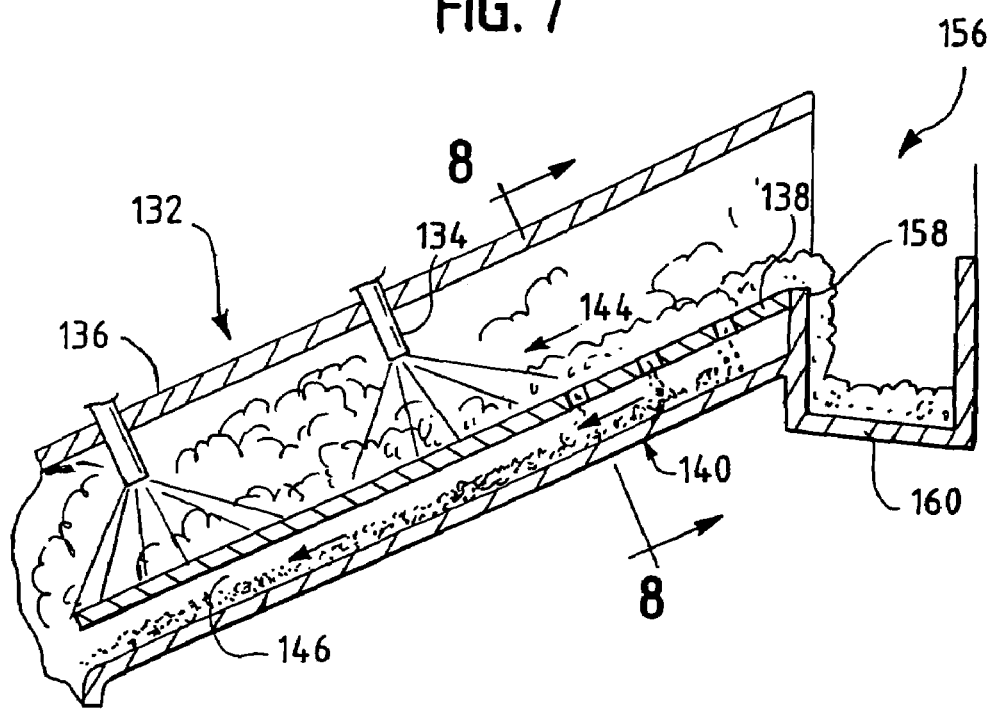
FIGS. 7 and 8 show partial cross-sectional views of a variation of a froth cleaning section of an apparatus according to the disclosure.
Figure 8:
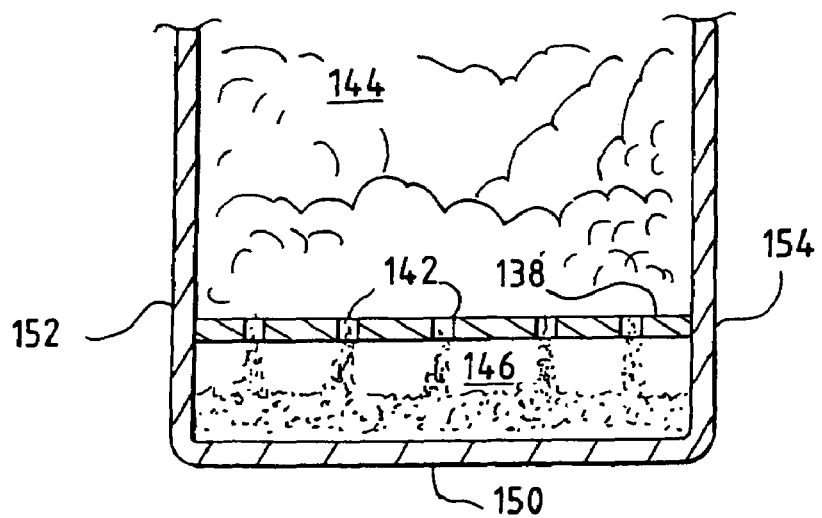

FIGS. 7 and 8 show another variation of an apparatus including a froth cleaning section 132, FIG. 7 being a partial view and FIG. 8 being a corresponding partial cross-sectional view. This apparatus includes a series of wash sprayers 134 (disposed in a top panel 136) and a perforated plate 138 in the support 140. Wash liquid passes through very fine holes 142 in the plate 138 to facilitate drainage of liquid from the froth 144 without substantial loss of froth 144 from the support 140. A bottom channel 146 formed by a bottom panel 150 and side panels 152 and 154 of the support 140 collects the wash water for return to the flotation cell (not shown), directly or indirectly, or for other disposal. The apparatus is provided with an air exit opening 156, and overflow weir 158 that leads to a launder 160. The top panel 136 can extend to the vicinity of the overflow weir 158 or, in some embodiments, can extend only so far as to provide support for the wash sprayers 134.

Figure 9:
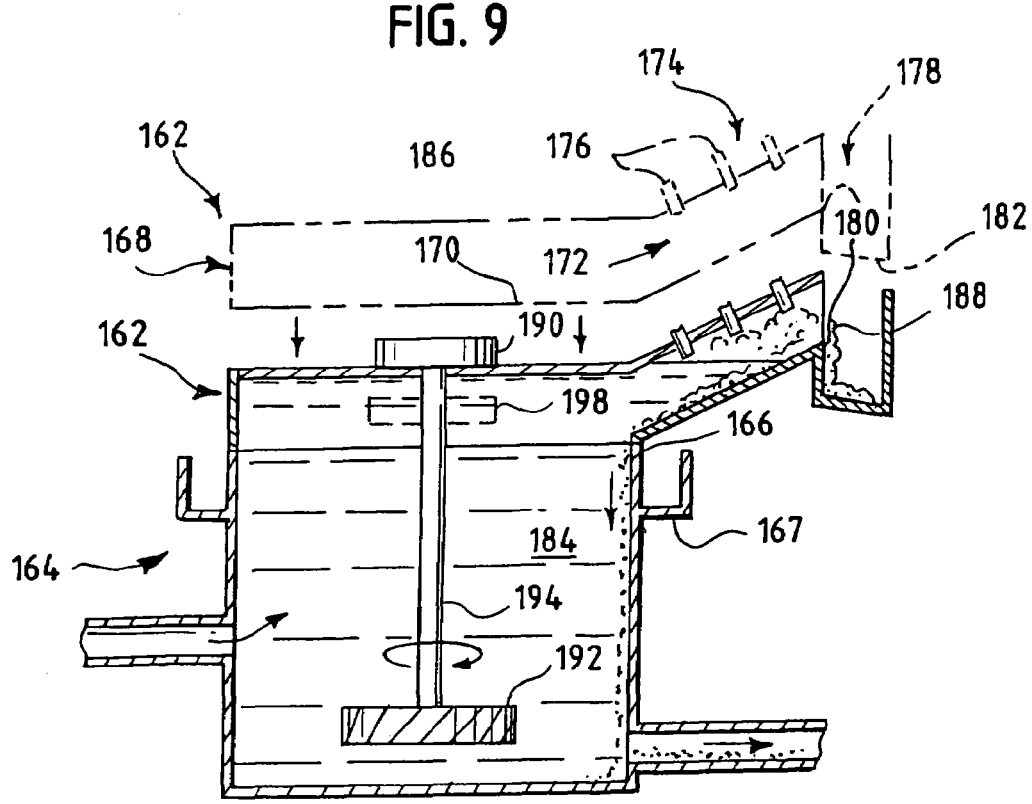
FIG. 9 is a partial cross-sectional view that shows the interface of an embodiment of a froth cleaning apparatus according to the disclosure with a type of flotation cell having an overflow weir and launder around the circumference of the cell, such as those known in the art.

FIG. 9 shows the interface of an embodiment of a froth cleaning apparatus 162 according to the disclosure with a type of flotation cell 164 having an overflow weir 166 and launder 167 around the circumference of the cell 164. The apparatus 162 is shown before installation (in phantom lines) and after installation. The apparatus 162 generally includes a hood 168 including a lower peripheral edge 170 for interface with the top of the cell 164 and a top 186. The apparatus 162 also includes a discharge orifice 172 in the hood 168 that leads to a cleaning section 174 having wash sprayers 176, an air exit opening 178, an overflow weir 180, and a launder 182. The cleaning section 174 can take any configuration, such as those described in FIGS. 1-8. Upon installation of the apparatus 162, the weir 166 and launder 167 are sealed to prevent leakage of pulp 184, and instead the washed froth 188 passes to launder 182.

To provide clearance for the hood, apparatus such as a pulley 190 that drives an agitator 192 might need to be relocated higher on the shaft 194 of the agitator 192, as shown in the figure wherein the former position of the pulley 190 is shown in phantom lines 198. Though not shown, the apparatus could be configured to make use of the existing launder 167 by conveyance of the washed froth 188 thereto.

Figure 10:
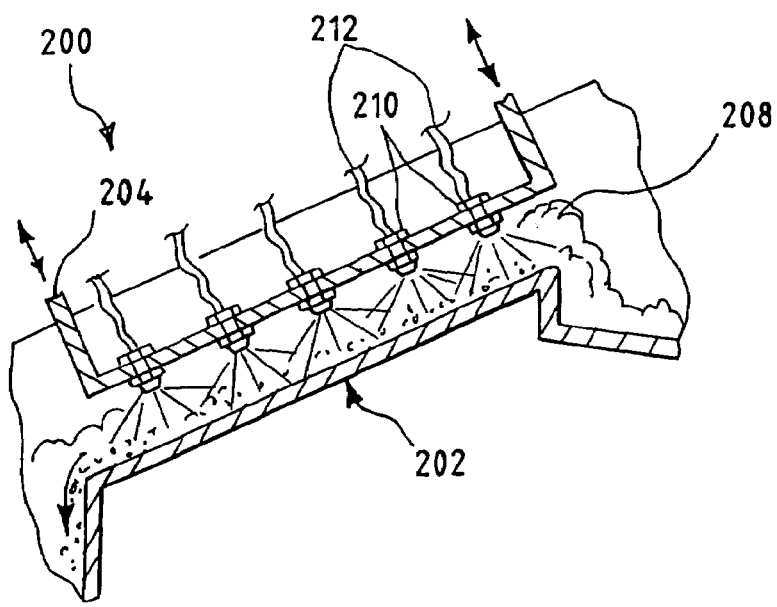
FIG. 10 is a partial cross-sectional view of a froth cleaning apparatus according to the disclosure including a froth support having a movable upper section to control the depth of froth passing through the cleaner.

FIG. 10 is a partial view of a froth cleaner section 200 including a froth support 202 having a movable upper section 204 to control the depth of froth 208 passing through the cleaner 200. In such an embodiment, wash sprayers 210 can be connected to associated flexible wash liquid supply lines 212 (e.g., hoses) to permit repositioning of the upper section 204.

Figure 11:
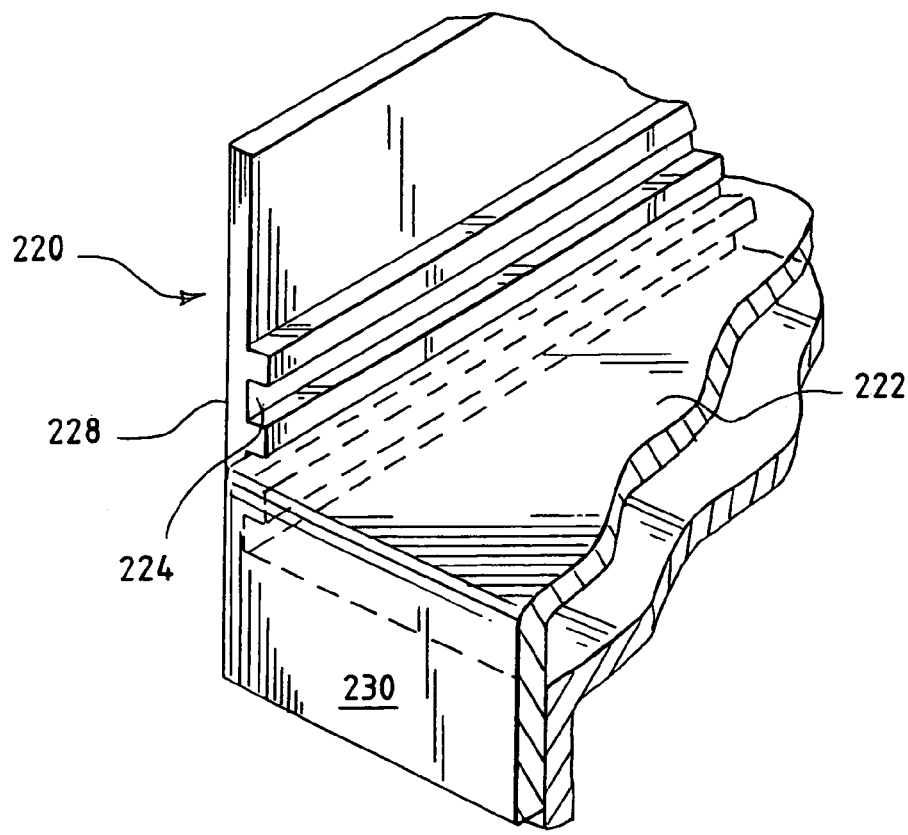
FIG. 11 shows a partial cutaway view of a froth support apparatus that includes a repositionable panel to change the height of a passage formed therewith from the bottom to control the depth of froth passed through the passage.

FIG. 11 shows a partial cutaway view of a froth support apparatus 220 that includes a repositionable panel 222 to change the height of a passage formed therewith from the bottom to control the depth of froth passed through the passage. As shown, the panel 222 can be secured in one of a selection of grooves 224 provided in side walls 228 (one shown) of the support 220. The panel 222 is also shown with a lip 230 to direct pulp and/or froth above the panel 222.

Figure 12:
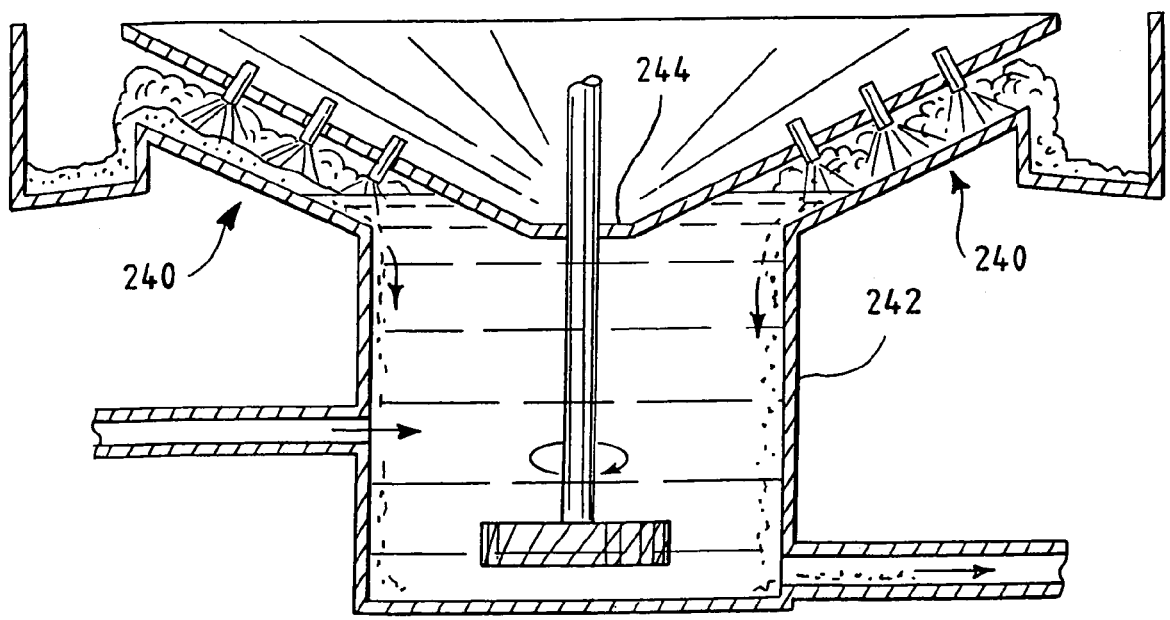
FIG. 12 is a partial cross-sectional view of a froth flotation apparatus according to the disclosure that includes a froth cleaning section around the circumference of the major body of a cell and a hood to allow a larger volume for froth cleaning.

FIG. 12 shows a froth flotation apparatus according to the disclosure that includes a froth cleaning section 240 around the circumference of the major body of a cell 242 and a hood 244 to allow a larger volume for froth cleaning. Such a cleaning section 240 and hood 244 can also be independently adapted for interface with an independent flotation cell, analogous to the apparatus described and shown in FIG. 9.

Figure 13:
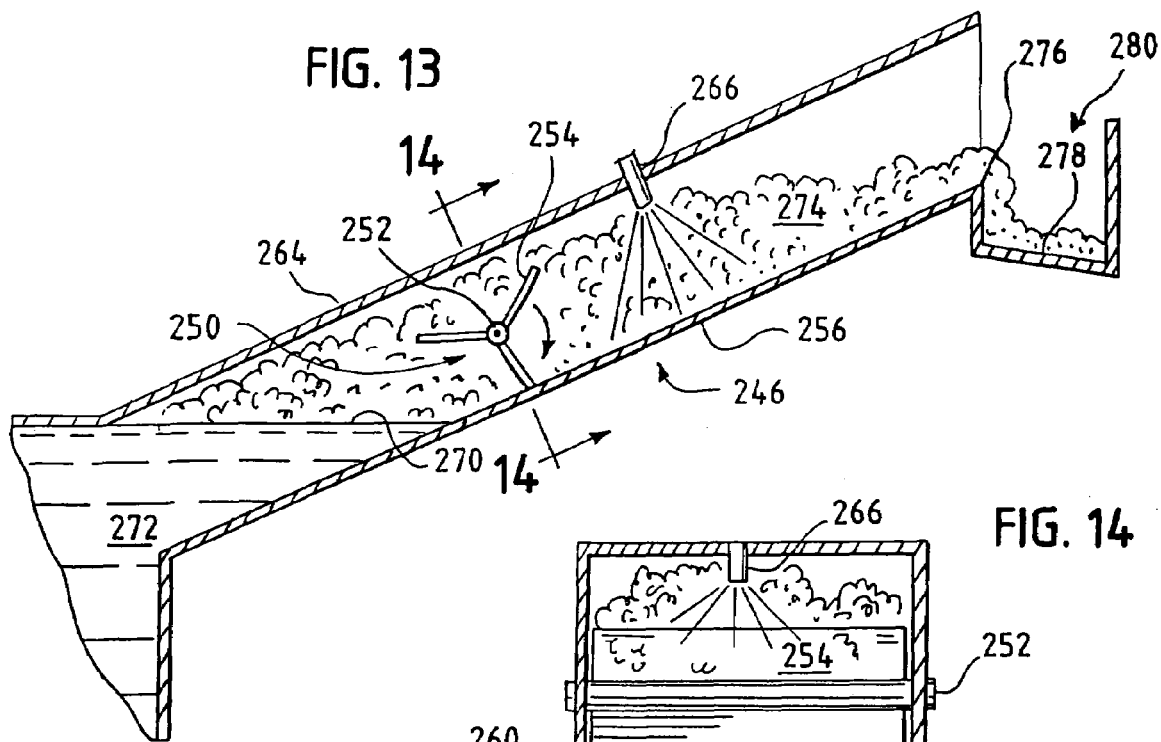
FIGS. 13 and 14 show partial cross-sectional views of a variation of a froth cleaning section of an apparatus according to the disclosure.
Figure 14:
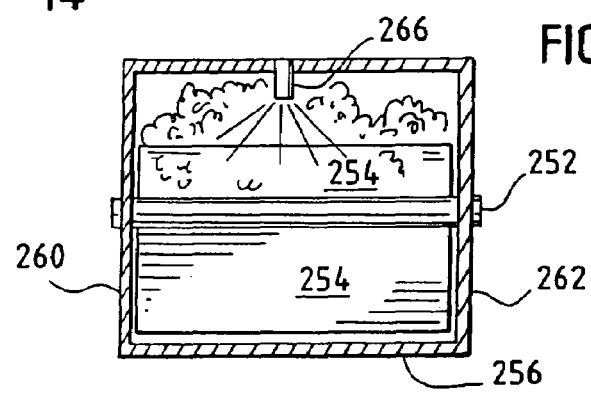
Figure 15:
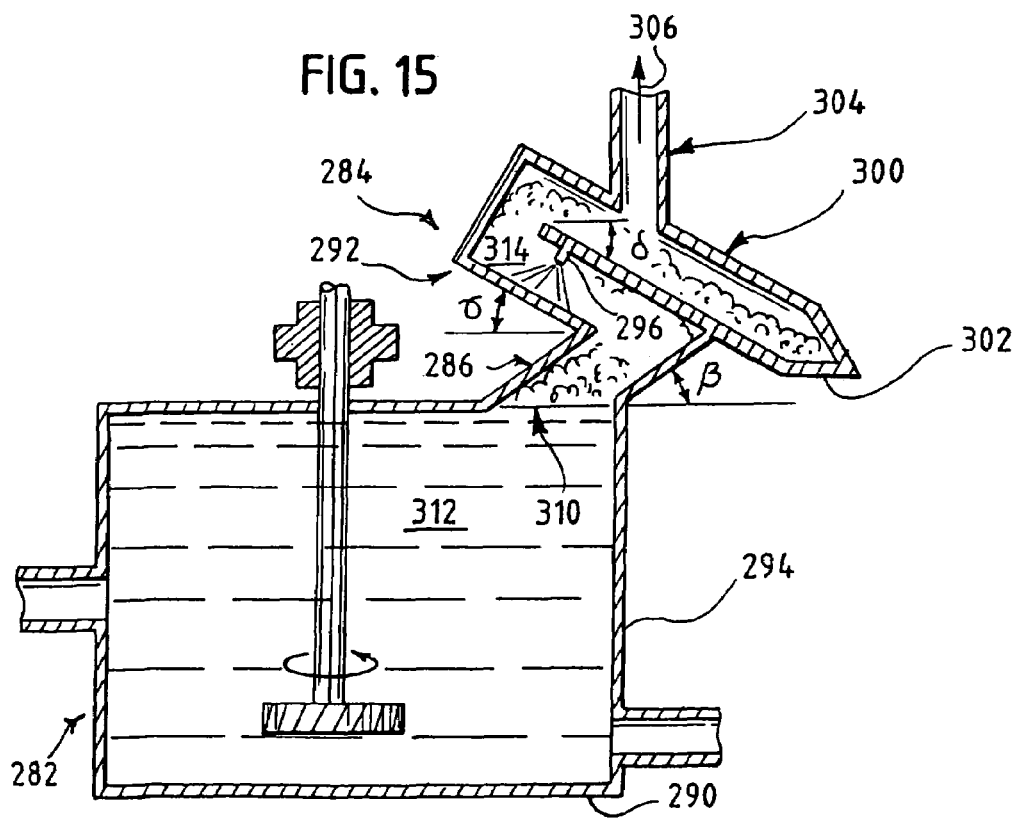
FIG. 15 shows a cross-section of a froth flotation apparatus according to the disclosure that includes a generally zigzag-shaped froth cleaning section.

FIGS. 13 to 15 show more apparatus adapted to cope with potential intermittent surges of pulp and concomitant or resulting changes in the position or level of the liquid froth interface. FIG. 13 shows a partial cutaway view of a froth support apparatus 246 that includes a mechanical froth motivator 250 in the form of a spindle 252 with pushers 254. The pushers 254 in this embodiment preferably intersect with the support 246 at the bottom panel 256 in a substantially sealing fashion, such that only insubstantial amounts of pulp and/or froth are permitted to pass the motivator 250 through the bottom passage bounded by the spindle 252, the bottom panel 256, and side walls 260 and 262 of the support 246 in a direction counter to the rotation of the froth motivator 250 (see also FIG. 14). For example, pushers 254 can be constructed of a flexible material and in a length slightly greater than the distance to the bottom panel 256 from the spindle 252, such that a pusher 254 bends upon intersection with the bottom panel 256, for example when perpendicular to the bottom panel 256. In one embodiment, the motivator 250 is designed or disposed to leave an open pathway between the top panel 264 of the support apparatus 246. In another embodiment, the motivator 250 is designed or disposed such that a pusher 254 intersects with the top panel 264 of the support apparatus 246. One or more wash sprayers 266 preferably are disposed at a location downstream of the froth motivator 250.

The a froth flotation apparatus (not shown) can be operated with such a support apparatus 246 in such a manner that the pulp level 270 is below the froth motivator 250, as shown, or the pulp level can be raised such that at least a portion of the motivator 250 intersects the pulp level 270. In the alternative, the motivator 250 can be disposed at a location in the support apparatus 246 at a location closer to the flotation cell, such that it at least partially intersects the pulp level 270, wherein the pulp level 270 is similar to that shown in FIG. 13.

If the pulp level 270 intermittently rises in surging fashion, such a motivator 250 can aid in preventing the pulp 272 from contaminating the cleaned froth 274 or from spilling over the weir 276 into the launder 278. Air exits through opening 280.

FIG. 15 shows a cross-section of a froth flotation apparatus 282 according to the disclosure that includes a generally zigzag-shaped froth cleaning section 284. The cleaning section 284 includes a first support section 286 disposed at a first upwardly-inclined angle $\beta$ with respect to the major plane of a base 290 and a second support section 292 disposed at a second upwardly-inclined angle $\gamma$ with respect to the major plane of the base 290. The first and second sections 286 and 292 are disposed in opposing directions with respect to a plane perpendicular to the major plane of the base (e.g., a plane parallel to the side wall 294). A wash sprayer 296 is disposed in the second support section 292 to spray wash liquid on the froth therein.

The apparatus 284 includes a third support section 300 disposed at a downwardly-inclined angle $\delta$ with respect to the base 290 of the flotation apparatus 282 for flow of the cleaned froth into a launder 302. A vent 304 for discharge of air 306 is in fluid communication with the third section 300, and can be located at any point along the third support section 300. The launder 302 can have an open top (e.g., at the lower end of the third support section 300, as illustrated) for discharge of air in addition to, or instead of a vent 304.

If the pulp level 310 intermittently rises in surging fashion into the first support section 286, the non-linear design of the first and second support sections 286 and 292 can break the momentum of the pulp 312 and aid in preventing the pulp 312 from contaminating the cleaned froth 314 or from spilling over into the launder 302.

EXAMPLES

The following examples are provided to illustrate the invention but are not intended to limit the scope of the invention.

Example 1

Figure 16:
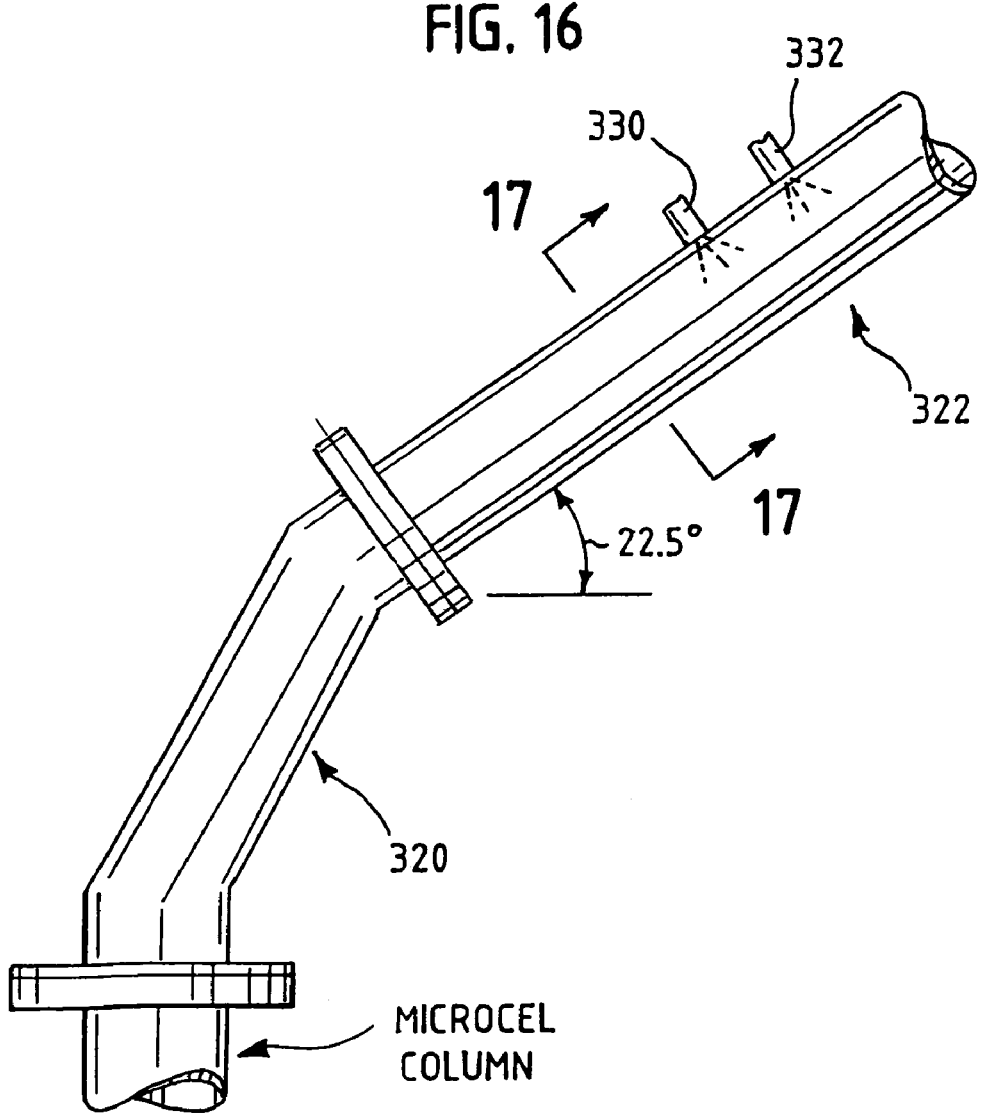
FIG. 16 shows a froth cleaning apparatus according to the disclosure interfaced with a laboratory-scale flotation column.
Figure 17:
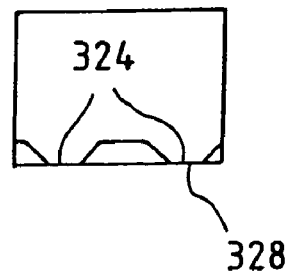
FIG. 17 shows a-cross-sectional view of the cleaning section of the apparatus in FIG. 16, showing a grooved lower support surface.

A froth cleaning apparatus according to FIG. 16, was constructed for interface with a 2-inch MICROCEL flotation column (developed by Roe-Hoan Yoon, of Virginia Polytechnic Institute and State University). The froth cleaning apparatus had a connecting conduit 320 and a washing conduit 322. The washing conduit 322 was 410 mm in length and 25 mm square in cross-section, with two internal grooves 324 on the lower face 328, as shown in FIG. 17.

A series of 3 wash sprayers (two shown, elements 330 and 332) were disposed in series along the path of froth flow, and any combination of the sprayers could be used for dispensing wash fluid. In the experiments reported in Examples 2 to 4 below, only two wash sprayers were used. The first wash sprayer 330 was disposed 165 mm from the outlet end of the wash conduit 322 and the second wash sprayer 332 was disposed 100 mm from the outlet end of the wash conduit 322.

The froth cleaning apparatus was attached to the main body of the MICROCEL column using a series of connectors and elbows (replacing the top launder section of the conventional MICROCEL column) to facilitate easy manipulation of the washer inclination at different angles. The results reported in Examples 2-4 were obtained by operating the apparatus at an angle of 22.5 degrees.

Example 2

Figure 18:
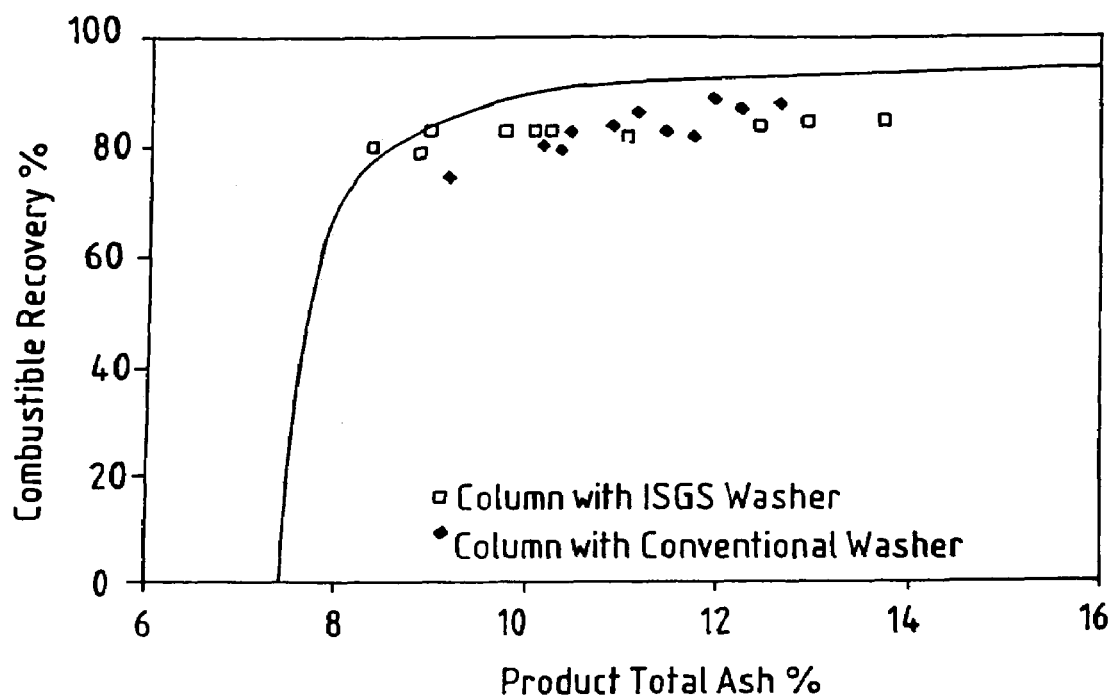
FIGS. 18 and 19 are charts comparing ash and sulfur rejection capabilities, respectively, of a conventional flotation column with froth washing and a conventional flotation column equipped with a froth cleaning apparatus according to the disclosure. The curves shown in the two figures plot the best possible cleaning performance according to Advanced Flotation Release analysis, as described below.
Figure 19:
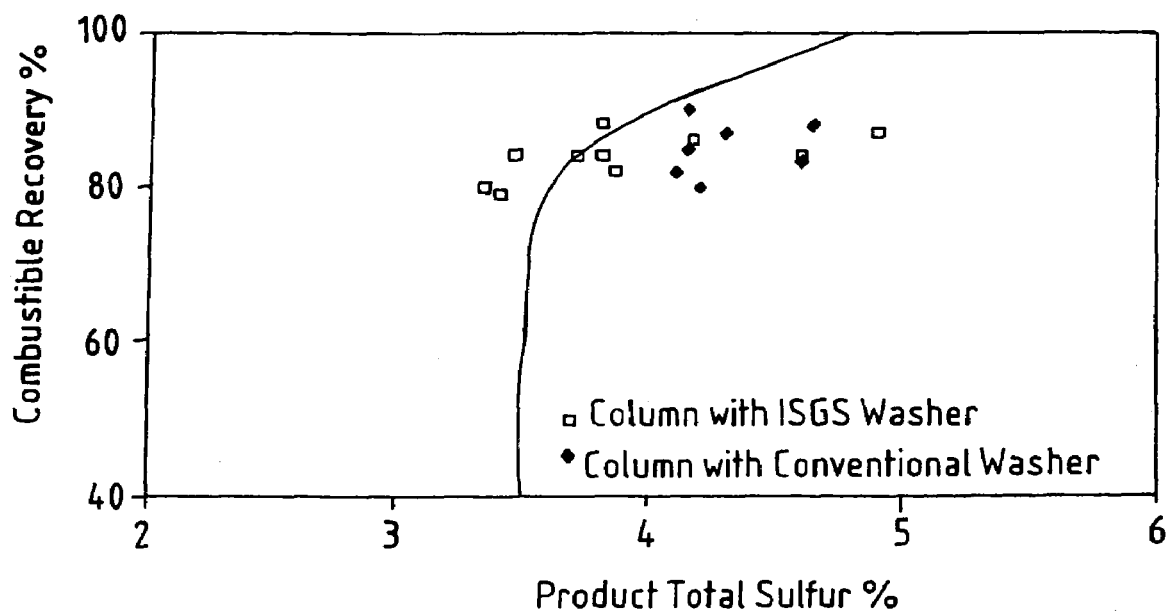

FIGS. 18 and 19 are charts comparing sulfur and ash rejection capabilities, respectively, of the MICROCEL flotation column with a conventional froth washer and the MICROCEL flotation column equipped with a froth cleaning apparatus according to Example 1 (two wash sprayers in operation). The results were obtained from treatment of −48 mesh particle size fraction Pittsburgh No. 8 coal refuse. The curves in FIGS. 18 and 19 represent predictions based on advanced flotation release tests, described below.

The results show that the column equipped with the apparatus of Example 1 generated a coal product with an ash content as low as 8.0% at a combustible recovery level of 80%, compared with an ash content of 10% at the same combustible recovery level achieved by the conventional flotation column and froth-washing system (see FIG. 18).

The results also show that the column equipped with the apparatus of Example 1 provided superior separation performance in terms of sulfur rejection. At a combustible recovery of nearly 80%, the column equipped with the apparatus of Example 1 reduced the total sulfur content to levels ranging from 5.1% to 3.3%, whereas 4.1% was the lowest sulfur concentration that could be achieved by the flotation column with a conventional froth washing system at the same recovery value (see FIG. 19).

Example 3

Figures 20, 21:
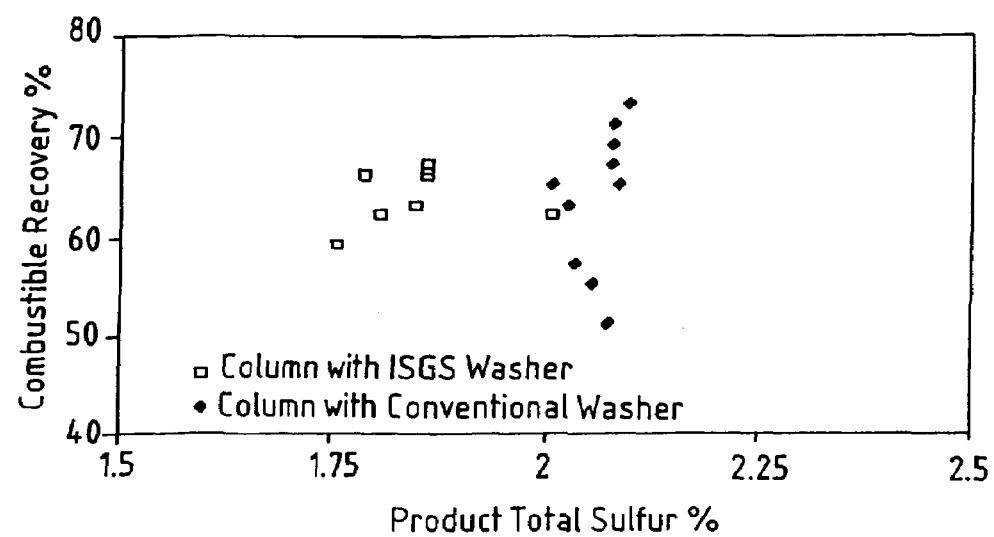
FIGS. 20 and 21 are charts comparing sulfur and ash rejection capabilities, respectively, the same apparatus used to generate FIGS. 18 and 19.

FIGS. 20 and 21 are charts comparing ash and sulfur rejection capabilities, respectively, of the same apparatus used in Example 2, and from treatment of the −325 mesh particle size fraction of the same sample as used for Example 2.

These side-by-side tests (see FIG. 20) again show a superior sulfur rejection performance for the column equipped by the apparatus of Example 1 (1.75% total sulfur content in the product) as compared to the conventional flotation-column (2.0% total sulfur content in the product). The performance of the apparatus of Example 1 also appeared to be superior for achieving a low ash product (better combustible recovery), but for higher ash products the conventional column provided better combustible recovery (see FIG. 21).

Example 4

Figure 22:
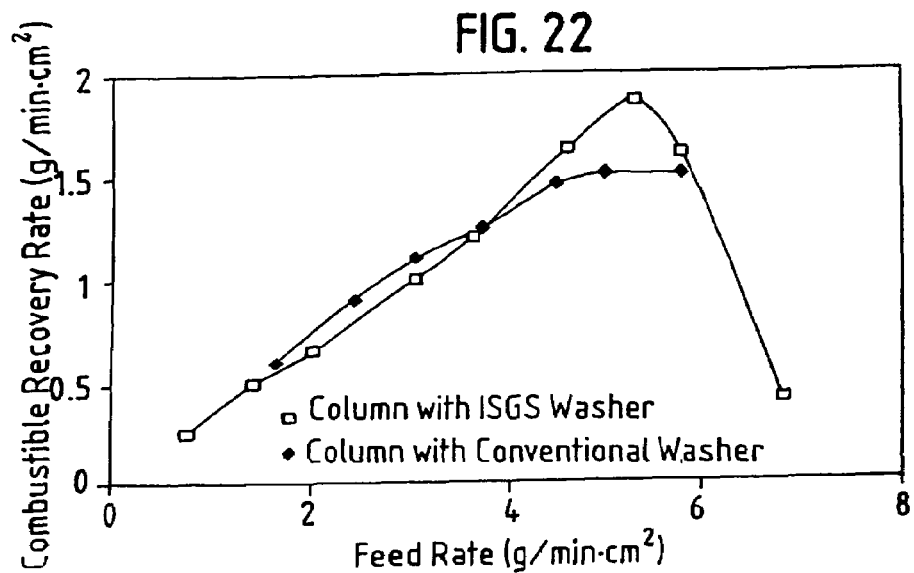
FIG. 22 shows the results of carrying capacity tests for an apparatus according to the disclosure.

Carrying capacity tests were carried out to determine the effect of pulp feed rate (g/(min·cm$^2$)) on the rate of combustible recovery (g/(min·cm$^2$)) feed) of a flotation column modified according to the disclosure. FIG. 22 shows the ability of an apparatus modified according to the disclosure to produce a larger amount of product per minute, on a constant cross-sectional area of column basis, believed to be the result of reduced bubble coalescence. As shown in FIG. 22, for the −325 mesh particle size fraction of coal refuse from the Pittsburgh No. 8 Coal Seam, the carrying capacity of the flotation column modified according to the disclosure was found to be 28% greater than the conventional flotation column.

Example 5

Various tests were carried out with a rectangular cuboid pilot plant-sized (about 37 liters in volume, outer dimensions about 28 cm by 43 cm by 51 cm tall) subaeration cell equipped with an apparatus similar to that shown in FIG. 9, referred to herein as the "Big Cell." As described above, subaeration cells are a proven technology with a higher throughput than other commercial flotation systems, and are more versatile and flexible than any other commercial flotation system. Adaptation of the subaeration cell by installing an apparatus according to the disclosure eliminates many of the shortcomings of the subaeration cell, such as incomplete separation of the product from the pulp.

Advanced Flotation Release (AFR) analysis should represent the best results that can be obtained with any commercial flotation device. The AFR analysis is a process developed by Southern Illinois University to establish the limits of achievement of flotation devices with regards to combustible recovery and reduction of ash-forming mineral matter and sulfur. A graph produced according to AFR analysis is established by floating the coal in a typical subaeration cell under conditions that will guarantee the fullest recovery of all the combustible as a product. This product is then floated in a packed column under optimum conditions and the material floated within a certain time interval is collected and analyzed.

These tests conducted with the Big Cell, on feeds containing various amounts of ash and sulfur, demonstrated ash and sulfur rejection rates by the Big Cell better than the level predicted by AFR analysis.

Figure 23:
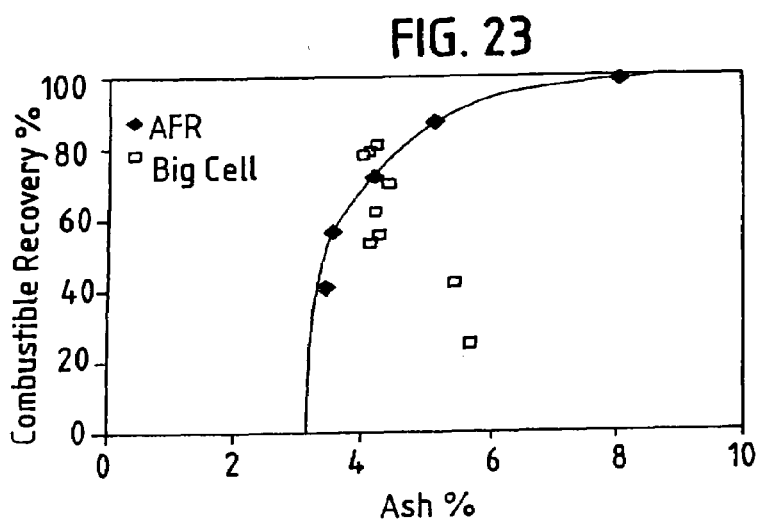
FIG. 23 plots combustible recovery versus total ash content of the product separated from a slurry (5% solids) of Illinois fine coal (8% ash) in AFR analysis and with a subaeration cell modified according to the disclosure.

Thus, FIG. 23 plots combustible recovery versus total ash content of the product separated from a slurry (5% solids) of Illinois fine coal (8% ash) by AFR analysis and with the Big Cell. The figure shows that the Big Cell achieved about 80% combustible recovery with as low as 4% ash content in the product, which is better than approximately 70% combustible recovery predicted by AFR analysis.

Figure 24:
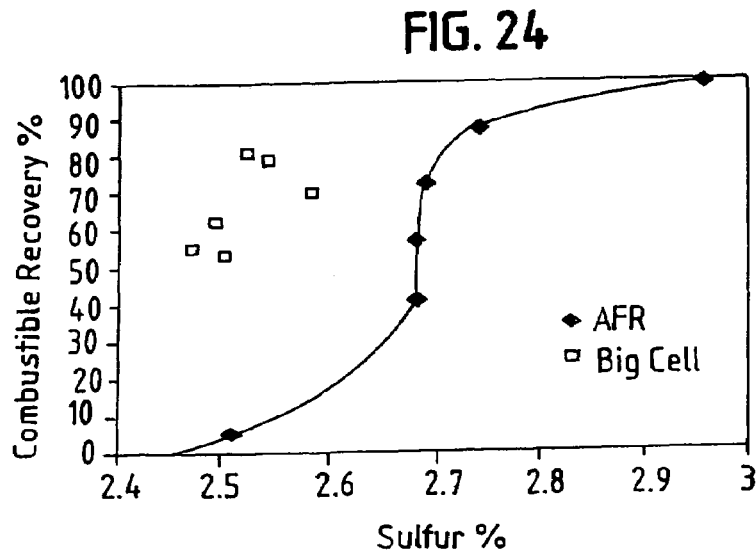
FIG. 24 plots combustible recovery versus total sulfur content of the product separated from a slurry (5% solids) of Illinois fine coal (3.17% sulfur) in AFR analysis and with a subaeration cell modified according to the disclosure.

FIG. 24 plots combustible recovery versus total sulfur content of the product separated from a slurry (5% solids) of Illinois fine coal (3.17% sulfur) by AFR analysis and with the Big Cell. As shown in the figure, the Big Cell achieved much lower sulfur content in the product than that predicted by AFR analysis for the same levels of combustible recovery.

Figure 25:
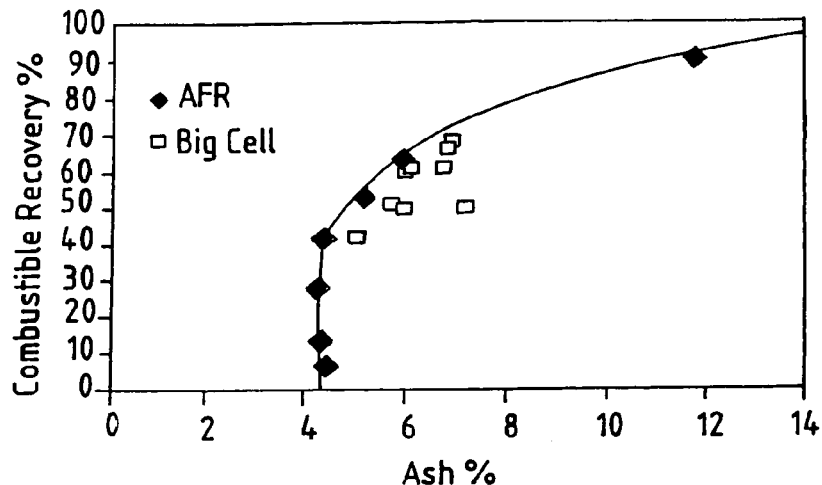
FIG. 25 plots combustible recovery versus total ash content of the product separated from a slurry (5% solids) of a reconstituted feed (24% ash) in AFR tests and with a subaeration cell modified according to the disclosure.

FIG. 25 plots combustible recovery versus total ash content of the product separated from a slurry (5% solids) of a reconstituted feed (24% ash) by AFR tests and with the Big Cell. In these tests, for this feed, the Big Cell approached the theoretical maximum ash rejection of conventional devices predicted by the AFR analysis for a range of combustible recovery levels.

Figure 26:
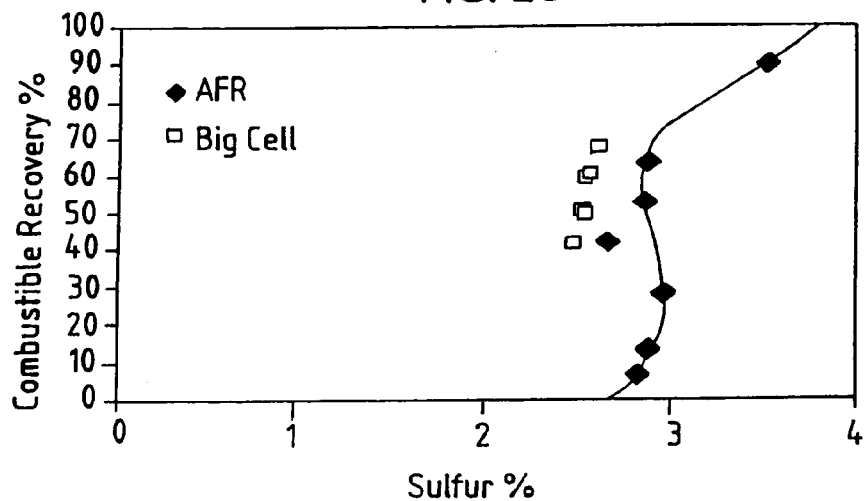
FIG. 26 plots combustible recovery versus total sulfur content of the product separated from a slurry (5% solids) of a reconstituted feed (3.44% sulfur) in AFR tests and with a subaeration cell modified according to the disclosure.

FIG. 26 plots combustible recovery versus total sulfur content of the product separated from a slurry (5% solids) of a reconstituted feed (3.44% sulfur) by AFR tests and with the Big Cell. As shown in the figure, the Big Cell achieved much lower sulfur content in the product than that predicted by AFR analysis for the same levels of combustible recovery.

Figure 27:
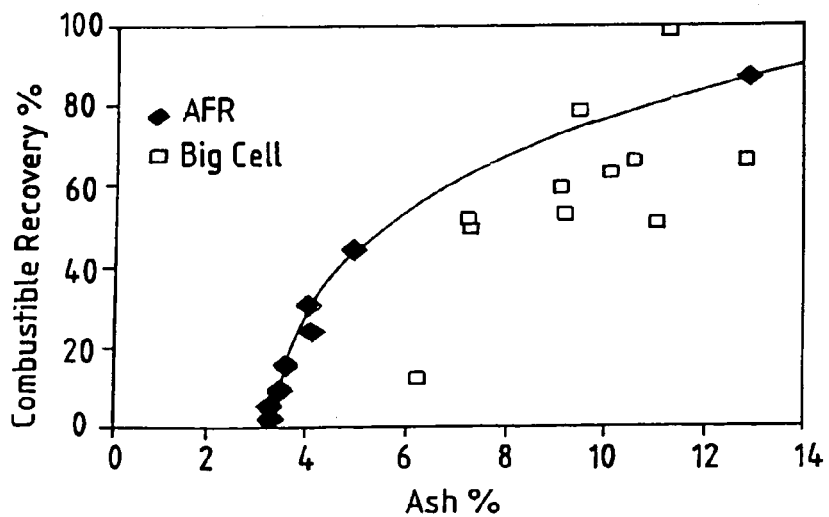
FIG. 27 plots combustible recovery versus total ash content of the product separated from a slurry (5% solids) of high-ash Illinois coal refuse (40% ash) in AFR tests and with a subaeration cell modified according to the disclosure.

FIG. 27 plots combustible recovery versus total ash content of the product separated from a slurry (5% solids) of high-ash Illinois coal refuse (40% ash) by AFR tests and with the Big Cell. As shown in the figure, the Big Cell achieved higher-than-predicted combustible recovery levels for higher ash content levels.

Figure 28:
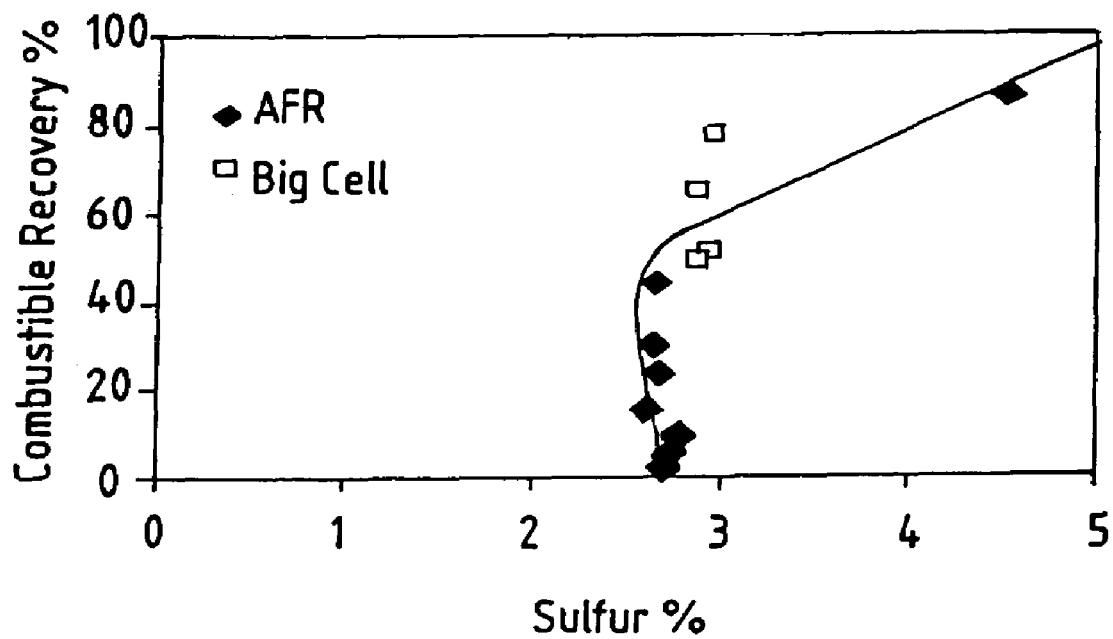
FIG. 28 plots combustible recovery versus total sulfur content of the product separated from a slurry (5% solids) of Illinois coal refuse (3.7% sulfur) in AFR tests and with a subaeration cell modified according to the disclosure.

FIG. 28 plots combustible recovery versus total sulfur content of the product separated from a slurry (5% solids) of Illinois coal refuse (3.7% sulfur) by AFR tests and with the Big Cell. As shown in the figure, the Big Cell achieved a higher combustible recovery level in the product than that predicted by AFR analysis for the same levels of sulfur content in the product.

Figure 29:
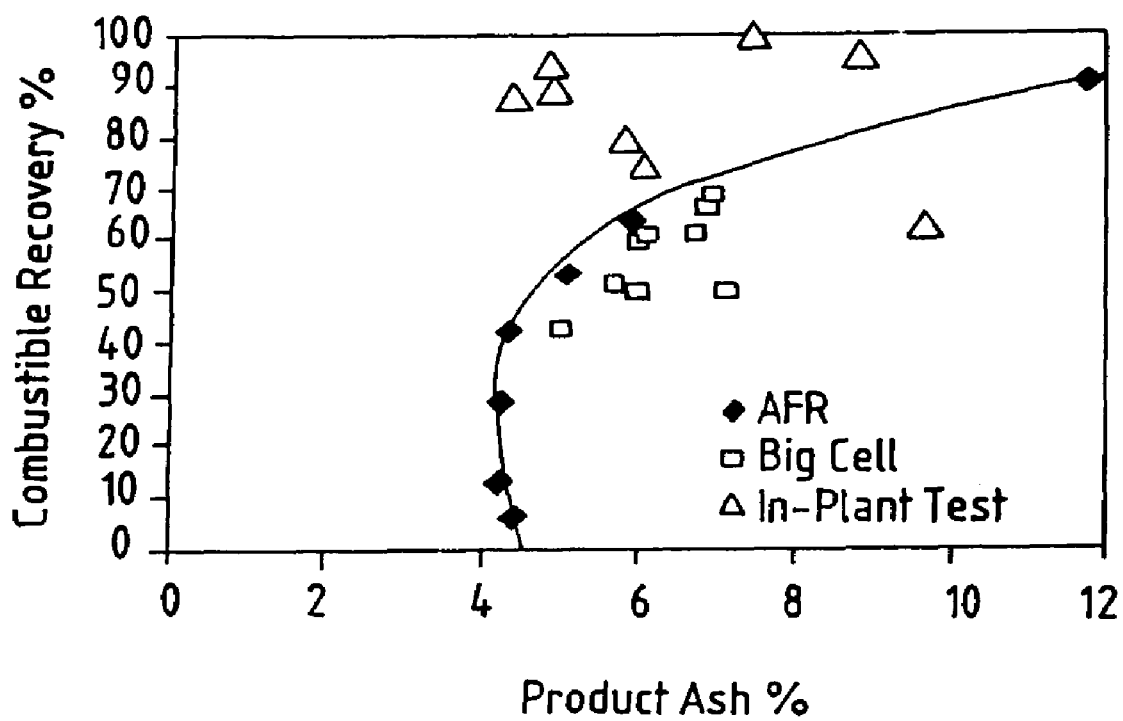
FIG. 29 plots combustible recovery versus total ash content of the product separated from a slurry (5% solids; 24% ash) of fine coal mixed with washing plant rejects (tailings) in AFR tests, with a subaeration cell modified according to the disclosure, and with a 1.3 ft$^3$ subaeration cell modified according to the disclosure to process a pulp (3% solids) containing fine coal with 26% ash drawn from the reject stream of an Illinois coal preparation plant.

FIG. 29 plots combustible recovery versus total ash content of the product separated from a slurry (5% solids; 24% ash) of fine coal mixed with washing plant rejects (tailings) by AFR tests and with the Big Cell. Plotted for comparison are data obtained from in-plant tests with the Big Cell fed a slurry with 3% solids and 26% ash content extracted from the tailings outfall from a coal washing plant in Illinois.

Various embodiments of the inventions can provide differing advantages, based on the objectives desired to be achieved with a flotation operation. For example, an embodiment of the invention adapted to retrofit a single subaeration cell can produce a cleaner coal product than that achieved with a flotation column, but at the large throughput rate of a common subaeration cell. Thus, a single device can take the place of a system of subaeration cell batteries in which the froth or tails from one cell are re-cleaned in a subsequent cell to generate a product of desired purity. An apparatus according to the disclosure can be operated to produce a well-drained, dry froth or a relatively wet, water-laden froth, depending on the needs of the system and the capacity of an associated filtration system.

The foregoing description is given for clearness of understanding only, and no unnecessary limitations should be understood therefrom, as modifications within the scope of the invention may be apparent to those having ordinary skill in the art. For example, variables such as aeration gas velocity, bubble size, pulp temperature, impeller speed, collector dosage, frother dosage, feed percent solids, volumetric feed rate, washer inclination, number of wash sprayers, froth height, bias rate, aeration gas volumetric rate, wash fluid volumetric rate, wash fluid velocity, wash fluid frother addition, and other properties known to those skilled in the art and based on the disclosure herein, can be controlled within desired ranges to affect the quality and speed of separation.

What is claimed is:

1. A froth cleaning apparatus for use with a froth flotation cell that causes froth to collect at the top of the froth flotation cell, said apparatus comprising:
   a hood comprising a lower peripheral edge for interface with the top of a froth flotation cell;
   a discharge orifice disposed in said hood;
   a froth support in communication with said discharge orifice for receiving and supporting said froth;
   a wash sprayer disposed downstream of said discharge orifice; and
   a screen disposed in proximity to and/or downstream of said discharge orifice in the path of travel of at least a portion of the generated froth.

2. The apparatus of claim 1, comprising a froth depth controller.

3. The apparatus of claim 2, wherein said froth depth controller is selected from the group consisting of said discharge orifice, said froth support, and combinations thereof.

4. The apparatus of claim 2, wherein said froth depth controller is a variable froth depth controller.

5. The apparatus of claim 1, wherein said froth support comprises a bottom interior surface of a conduit having an average width greater than an average height.

6. The apparatus of claim 1, wherein said lower edge lies substantially in a major plane and wherein said froth support is disposed at an upwardly-inclined angle with respect to a major plane.

7. The apparatus of claim 6, wherein said froth support has a convoluted path for fluid travel.

8. The apparatus of claim 7, wherein said froth support comprises a first support section disposed at a first upwardly-inclined angle with respect to said major plane; and
   a second support section disposed at a second upwardly-inclined angle, same or different, with respect to said major plane,
   wherein said first and second sections are disposed in opposing directions with respect to a plane perpendicular to said major plane.

9. The apparatus of claim 1, wherein said froth support comprises a perforated region.

10. The apparatus of claim 1, further comprising a plurality of spray washers.

11. The apparatus of claim 1, further comprising a froth motivator.

12. A froth cleaning apparatus for use with a froth flotation cell that causes froth to collect at the top of the froth flotation cell, said apparatus comprising:
   a hood comprising a lower peripheral edge for interface with the top of a froth flotation cell;
   a discharge orifice disposed in said hood;

a froth support in communication with said discharge orifice for receiving and supporting said froth; and a wash sprayer disposed downstream of said discharge orifice, wherein said froth support has a convoluted path for fluid travel.

13. The apparatus of claim 12, wherein said froth support comprises a bottom interior surface of a conduit having an average width greater than an average height.

14. The apparatus of claim 12, wherein said lower edge lies substantially in a major plane and wherein said froth support is disposed at an upwardly-inclined angle with respect to said major plane.

15. The apparatus of claim 14, wherein said froth support comprises a first support section disposed at a first upwardly-inclined angle with respect to said major plane; and a second support section disposed at a second upwardly-inclined angle, same or different, with respect to said major plane, wherein said first and second sections are disposed in opposing directions with respect to a plane perpendicular to said major plane.

16. The apparatus of claim 12, further comprising a froth motivator.

17. A froth cleaning apparatus for use with a froth flotation cell that causes froth to collect at the top of the froth flotation cell, said apparatus comprising:

a hood comprising a lower peripheral edge for interface with the top of a froth flotation cell;

a discharge orifice disposed in said hood;

a froth support in communication with said discharge orifice for receiving and supporting said froth; and a wash sprayer disposed downstream of said discharge orifice, wherein said froth support comprises a froth drainer to substantially separate wash fluid containing dislodged particles from contact with one or more of separated froth and washed froth, said froth drainer selected from the group consisting of a perforated region of said froth support, a nonplanar surface profile of said froth support, and combinations thereof.

18. The apparatus of claim 17, comprising a froth depth controller.

19. The apparatus of claim 17, wherein said froth support comprises a bottom interior surface of a conduit having an average width greater than an average height.

20. The apparatus of claim 17, wherein said lower edge lies substantially in a major plane and wherein said froth support is disposed at an upwardly-inclined angle with respect to said major plane.

21. The apparatus of claim 20, wherein said froth support has a convoluted path for fluid travel.

22. The apparatus of claim 21, wherein said froth support comprises a first support section disposed at a first upwardly-inclined angle with respect to said major plane; and a second support section disposed at a second upwardly-inclined angle, same or different, with respect to said major plane, wherein said first and second sections are disposed in opposing directions with respect to a plane perpendicular to said major plane.

23. The apparatus of claim 17, further comprising a froth motivator.

24. The apparatus of claim 17, further comprising a screen disposed in proximity to and/or downstream of said discharge orifice in the path of travel of at least a portion of the generated froth.

25. A froth cleaning apparatus for use with a froth flotation cell that causes froth to collect at the top of the froth flotation cell, said apparatus comprising:

a hood comprising a lower peripheral edge for interface with the top of a froth flotation cell;

a discharge orifice disposed in said hood;

a froth support in communication with said discharge orifice for receiving and supporting said froth; and a wash sprayer disposed downstream of said discharge orifice, wherein said froth support has a continuous cross-sectional perimeter and comprises a vent.

26. The apparatus of claim 25, wherein the vent size and/or the vent location is variable.

27. The apparatus of claim 26, comprising a froth depth controller.

28. The apparatus of claim 25, wherein said froth support comprises a bottom interior surface of a conduit having an average width greater than an average height.

29. The apparatus of claim 25, wherein said lower edge lies substantially in a major plane and wherein said froth support is disposed at an upwardly-inclined angle with respect to said major plane.

30. The apparatus of claim 29, wherein said froth support has a convoluted path for fluid travel.

31. The apparatus of claim 30, wherein said froth support comprises a first support section disposed at a first upwardly-inclined angle with respect to said major plane; and a second support section disposed at a second upwardly-inclined angle, same or different, with respect to said major plane, wherein said first and second sections are disposed in opposing directions with respect to a plane perpendicular to said major plane.

32. The apparatus of claim 25, further comprising a froth motivator.

33. The apparatus of claim 25, further comprising a screen disposed in proximity to and/or downstream of said discharge orifice in the path of travel of at least a portion of the generated froth.

34. A froth cleaning apparatus for use with a froth flotation cell that causes froth to collect at the top of the froth flotation cell, said apparatus comprising:

a hood comprising a lower peripheral edge for interface with the top of a froth flotation cell;

a discharge orifice disposed in said hood;

a froth support in communication with said discharge orifice for receiving and supporting said froth;

a wash sprayer disposed downstream of said discharge orifice; and a froth motivator disposed in substantially sealing relationship with a bottom portion of said support.

35. The apparatus of claim 34, comprising a froth depth controller.

36. The apparatus of claim 34, wherein said froth support comprises a bottom interior surface of a conduit having an average width greater than an average height.

37. The apparatus of claim 34, wherein said lower edge lies substantially in a major plane and wherein said froth support is disposed at an upwardly-inclined angle with respect to said major plane.

38. The apparatus of claim 34, wherein said froth support comprises a froth drainer to substantially separate wash fluid containing dislodged particles from contact with one or more of separated froth and washed froth.

39. The apparatus of claim 34, further comprising a screen disposed in proximity to and/or downstream of said discharge orifice in the path of travel of at least a portion of the generated froth.

* * * * *